United States Patent
Kasada

(10) Patent No.: US 10,522,180 B2
(45) Date of Patent: *Dec. 31, 2019

(54) MAGNETIC TAPE INCLUDING CHARACTERIZED MAGNETIC LAYER, TAPE CARTRIDGE, RECORDING AND REPRODUCING DEVICE, AND METHOD OF MANUFACTURING

(71) Applicant: FUJIFILM Corporation, Tokyo (JP)

(72) Inventor: Norihito Kasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/380,336

(22) Filed: Dec. 15, 2016

(65) Prior Publication Data

US 2017/0178676 A1 Jun. 22, 2017

(30) Foreign Application Priority Data

Dec. 16, 2015 (JP) .................. 2015-245145

(51) Int. Cl.
*G11B 5/71* (2006.01)
*G11B 5/706* (2006.01)
(Continued)

(52) U.S. Cl.
CPC ............ *G11B 5/71* (2013.01); *G11B 5/70626* (2013.01); *G11B 5/7305* (2013.01); *G11B 5/78* (2013.01); *G11B 5/8412* (2013.01)

(58) Field of Classification Search
None
See application file for complete search history.

(56) References Cited

U.S. PATENT DOCUMENTS 3,966,686 A 6/1976 Asakura et al.
4,112,187 A 9/1978 Asakura et al.
(Continued)

FOREIGN PATENT DOCUMENTS

DE 101 46 429 A1 3/2002
GB 2495356 A 4/2013
(Continued)

OTHER PUBLICATIONS

Communication dated May 7, 2018 from the U.S. Patent and Trademark Office in U.S. Appl. No. 15/626,832.
(Continued)

*Primary Examiner* — Kevin M Bernatz
(74) *Attorney, Agent, or Firm* — Sughrue Mion, PLLC

(57) ABSTRACT

The magnetic tape has a nonmagnetic layer containing nonmagnetic powder and binder on a nonmagnetic support, and a magnetic layer containing ferromagnetic powder and binder on the nonmagnetic layer; wherein the combined thickness of the nonmagnetic layer and the magnetic layer is less than or equal to 0.60 μm, the coefficient of friction as measured on the base portion of the surface of the magnetic layer is less than or equal to 0.35, at least the magnetic layer contains one or more components selected from the group consisting of a fatty acid and a fatty acid amide, and a C—H derived carbon, C, concentration calculated from a C—H peak area ratio in a C1s spectrum obtained by X-ray photoelectron spectroscopy conducted at a photoelectron take-off angle of 10 degrees on the surface of the magnetic layer is greater than or equal to 45 atom %.

17 Claims, 1 Drawing Sheet

(51) Int. Cl.
*G11B 5/73* (2006.01)
*G11B 5/78* (2006.01)
*G11B 5/84* (2006.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2 * | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 * | 7/2017 | Kasada | G11B 5/70605 |
| 9,711,174 B2 * | 7/2017 | Kasada | G11B 5/71 |
| 9,721,605 B2 * | 8/2017 | Oyanagi | G11B 5/71 |
| 9,721,606 B2 * | 8/2017 | Kasada | G11B 5/8404 |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 * | 10/2017 | Kasada | G11B 5/70 |
| 9,837,104 B1 | 12/2017 | Biskeborn | |
| 9,837,116 B2 | 12/2017 | Ozawa et al. | |
| 9,959,894 B2 * | 5/2018 | Omura | G11B 5/733 |
| 9,972,351 B1 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 * | 5/2018 | Kaneko | G11B 5/70 |
| 10,008,230 B1 | 6/2018 | Ozawa et al. | |
| 10,026,430 B2 * | 7/2018 | Kasada | G11B 5/708 |
| 10,026,433 B2 * | 7/2018 | Kasada | G11B 5/78 |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2 * | 11/2018 | Kasada | G11B 5/70 |
| 10,347,280 B2 * | 7/2019 | Kasada | G11B 5/584 |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 | 2/2012 | Tanaka et al. | |
| 2012/0177951 A1 | 7/2012 | Yamazaki et al. | |
| 2012/0183811 A1 | 7/2012 | Hattori et al. | |
| 2012/0196156 A1 | 8/2012 | Suzuki | |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |

(56) References Cited

U.S. PATENT DOCUMENTS

| | | | |
|---|---|---|---|
| 2013/0029183 A1 | 1/2013 | Omura | |
| 2013/0084470 A1 | 4/2013 | Hattori et al. | |
| 2013/0088794 A1 | 4/2013 | Cherubini et al. | |
| 2013/0256584 A1 | 10/2013 | Yamazaki et al. | |
| 2013/0260179 A1 | 10/2013 | Kasada et al. | |
| 2013/0279040 A1 | 10/2013 | Cideciyan et al. | |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1 | 9/2014 | Kasada | |
| 2014/0295214 A1 | 10/2014 | Tada et al. | |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0302879 A1 | 10/2015 | Holmberg et al. | |
| 2015/0380036 A1 | 12/2015 | Kasada et al. | |
| 2016/0061447 A1 | 3/2016 | Kobayashi | |
| 2016/0064025 A1 | 3/2016 | Kurokawa et al. | |
| 2016/0092315 A1* | 3/2016 | Ashida | G06F 11/1469 707/684 |
| 2016/0093321 A1 | 3/2016 | Aoshima et al. | |
| 2016/0093322 A1 | 3/2016 | Kasada et al. | |
| 2016/0093323 A1 | 3/2016 | Omura | |
| 2016/0180875 A1 | 6/2016 | Tanaka et al. | |
| 2016/0189739 A1 | 6/2016 | Kasada et al. | |
| 2016/0189740 A1 | 6/2016 | Oyanagi et al. | |
| 2016/0247530 A1 | 8/2016 | Kasada | |
| 2016/0260449 A1 | 9/2016 | Ahmad et al. | |
| 2016/0276076 A1 | 9/2016 | Kasada | |
| 2017/0032812 A1 | 2/2017 | Kasada | |
| 2017/0053669 A1 | 2/2017 | Kasada | |
| 2017/0053670 A1 | 2/2017 | Oyanagi et al. | |
| 2017/0053671 A1 | 2/2017 | Kasada et al. | |
| 2017/0058227 A1 | 3/2017 | Kondo et al. | |
| 2017/0092315 A1 | 3/2017 | Ozawa et al. | |
| 2017/0130156 A1 | 5/2017 | Kondo et al. | |
| 2017/0178675 A1 | 6/2017 | Kasada | |
| 2017/0178677 A1* | 6/2017 | Kasada | G11B 5/78 |
| 2017/0186456 A1 | 6/2017 | Tada et al. | |
| 2017/0186460 A1 | 6/2017 | Kasada et al. | |
| 2017/0221513 A1 | 8/2017 | Hiroi et al. | |
| 2017/0221516 A1* | 8/2017 | Oyanagi | G11B 5/70 |
| 2017/0221517 A1 | 8/2017 | Ozawa et al. | |
| 2017/0249963 A1* | 8/2017 | Oyanagi | G11B 5/71 |
| 2017/0249964 A1 | 8/2017 | Kasada et al. | |
| 2017/0249965 A1 | 8/2017 | Kurokawa et al. | |
| 2017/0249966 A1 | 8/2017 | Tachibana et al. | |
| 2017/0287517 A1 | 10/2017 | Hosoya et al. | |
| 2017/0355022 A1 | 12/2017 | Kaneko et al. | |
| 2017/0358318 A1* | 12/2017 | Kasada | G11B 5/00813 |
| 2017/0372726 A1* | 12/2017 | Kasada | G11B 5/00813 |
| 2017/0372727 A1 | 12/2017 | Kasada et al. | |
| 2017/0372736 A1 | 12/2017 | Kaneko et al. | |
| 2017/0372737 A1* | 12/2017 | Oyanagi | G11B 5/00813 |
| 2017/0372738 A1* | 12/2017 | Kasada | G11B 5/00813 |
| 2017/0372739 A1* | 12/2017 | Ozawa | G11B 5/71 |
| 2017/0372740 A1 | 12/2017 | Ozawa et al. | |
| 2017/0372741 A1* | 12/2017 | Kurokawa | G11B 5/78 |
| 2017/0372742 A1 | 12/2017 | Kaneko et al. | |
| 2017/0372743 A1* | 12/2017 | Kasada | G11B 5/584 |
| 2017/0372744 A1 | 12/2017 | Ozawa et al. | |
| 2018/0061446 A1 | 3/2018 | Kasada | |
| 2018/0061447 A1 | 3/2018 | Kasada | |
| 2018/0082710 A1 | 3/2018 | Tada et al. | |
| 2018/0137887 A1 | 5/2018 | Sekiguchi et al. | |
| 2018/0182417 A1* | 6/2018 | Kaneko | G11B 5/00826 |
| 2018/0182422 A1 | 6/2018 | Kawakami et al. | |
| 2018/0182425 A1 | 6/2018 | Kasada et al. | |
| 2018/0182426 A1 | 6/2018 | Ozawa et al. | |
| 2018/0182427 A1 | 6/2018 | Kasada et al. | |
| 2018/0182428 A1* | 6/2018 | Kasada | G11B 5/78 |
| 2018/0182429 A1* | 6/2018 | Kasada | G11B 15/46 |
| 2018/0182430 A1 | 6/2018 | Ozawa et al. | |
| 2018/0240475 A1 | 8/2018 | Kasada | |
| 2018/0240476 A1 | 8/2018 | Kasada et al. | |
| 2018/0240478 A1 | 8/2018 | Kasada et al. | |
| 2018/0240479 A1 | 8/2018 | Kasada et al. | |
| 2018/0240481 A1 | 8/2018 | Kasada et al. | |
| 2018/0240488 A1 | 8/2018 | Kasada | |
| 2018/0240489 A1 | 8/2018 | Kasada et al. | |
| 2018/0240490 A1 | 8/2018 | Kurokawa et al. | |
| 2018/0240491 A1 | 8/2018 | Ozawa et al. | |
| 2018/0240492 A1 | 8/2018 | Kasada | |
| 2018/0240493 A1 | 8/2018 | Tada et al. | |
| 2018/0240494 A1 | 8/2018 | Kurokawa et al. | |
| 2018/0240495 A1 | 8/2018 | Kasada | |
| 2018/0286439 A1 | 10/2018 | Ozawa et al. | |
| 2018/0286442 A1 | 10/2018 | Ozawa et al. | |
| 2018/0286443 A1 | 10/2018 | Ozawa et al. | |
| 2018/0286444 A1 | 10/2018 | Kasada et al. | |
| 2018/0286446 A1 | 10/2018 | Ozawa et al. | |
| 2018/0286447 A1 | 10/2018 | Ozawa et al. | |
| 2018/0286448 A1 | 10/2018 | Ozawa et al. | |
| 2018/0286449 A1 | 10/2018 | Kasada et al. | |
| 2018/0286450 A1* | 10/2018 | Kasada | G11B 5/70 |
| 2018/0286451 A1 | 10/2018 | Ozawa et al. | |
| 2018/0286452 A1 | 10/2018 | Ozawa et al. | |
| 2018/0286453 A1* | 10/2018 | Kasada | G11B 5/714 |
| 2018/0301165 A1 | 10/2018 | Oyanagi et al. | |
| 2018/0350398 A1 | 12/2018 | Kawakami et al. | |
| 2018/0350400 A1 | 12/2018 | Kaneko et al. | |
| 2018/0358042 A1 | 12/2018 | Kasada et al. | |
| 2018/0374507 A1 | 12/2018 | Kasada | |
| 2019/0027167 A1* | 1/2019 | Tada | G11B 5/00813 |
| 2019/0027168 A1 | 1/2019 | Kasada et al. | |
| 2019/0027171 A1 | 1/2019 | Kasada | |
| 2019/0027172 A1 | 1/2019 | Kasada | |
| 2019/0027174 A1 | 1/2019 | Tada et al. | |
| 2019/0027175 A1 | 1/2019 | Kurokawa et al. | |
| 2019/0027176 A1 | 1/2019 | Kurokawa et al. | |
| 2019/0027177 A1 | 1/2019 | Kasada | |
| 2019/0027178 A1 | 1/2019 | Kasada | |
| 2019/0027179 A1 | 1/2019 | Ozawa et al. | |
| 2019/0027180 A1 | 1/2019 | Kasada et al. | |
| 2019/0027181 A1 | 1/2019 | Ozawa et al. | |
| 2019/0035424 A1 | 1/2019 | Endo | |
| 2019/0051325 A1* | 2/2019 | Kasada | G11B 5/584 |
| 2019/0088278 A1 | 3/2019 | Kasada et al. | |
| 2019/0096437 A1 | 3/2019 | Ozawa et al. | |
| 2019/0103130 A1 | 4/2019 | Kasada et al. | |
| 2019/0103131 A1 | 4/2019 | Kasada et al. | |
| 2019/0103133 A1 | 4/2019 | Ozawa et al. | |
| 2019/0103134 A1* | 4/2019 | Kasada | G11B 5/72 |
| 2019/0103135 A1 | 4/2019 | Ozawa et al. | |
| 2019/0130936 A1* | 5/2019 | Kaneko | G11B 5/00826 |

FOREIGN PATENT DOCUMENTS

| | | |
|---|---|---|
| JP | 61-139932 A | 6/1986 |
| JP | 63-129519 A | 6/1988 |
| JP | 63-249932 A | 10/1988 |
| JP | 61-11924 A | 1/1989 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |

(56) References Cited

FOREIGN PATENT DOCUMENTS

| | | |
|---|---|---|
| JP | 2004-185676 A | 7/2004 |
| JP | 2005-38579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-049731 A | 3/2010 |
| JP | 2011-48878 A | 3/2011 |
| JP | 2011-138566 A | 7/2011 |
| JP | 2011-210288 A | 10/2011 |
| JP | 2011-225417 A | 11/2011 |
| JP | 2012-038367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 201 4-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |
| JP | 2016-71926 A | 5/2016 |
| JP | 2016-139451 A | 8/2016 |

OTHER PUBLICATIONS

Communication dated May 7, 2018 from the U.S. Patent and Trademark Office in U.S. Appl. No. 15/624,897.
Communication dated May 7, 2018 from the U.S. Patent and Trademark Office in U.S. Appl. No. 15/624,792.
Communication dated May 4, 2018 from the U.S. Patent and Trademark Office in U.S. Appl. No. 15/422,821.
Communication dated May 4, 2018 from the U.S. Patent and Trademark Office in U.S. Appl. No. 15/625,428.
Communication dated May 4, 2018 from the U.S. Patent and Trademark Office in U.S. Appl. No. 15/422,944.
Communication dated May 2, 2018 from the U.S. Patent and Trademark Office in U.S. Appl. No. 15/280,195.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Notice of Allowance dated Aug. 30, 2017, which issued during the prosecution of U.S. Appl. No. 15/466,143.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 14/522,821.
Notice of Allowance dated Sep. 4, 2018, which issued during the prosecution of U.S. Appl. No. 15/625,428.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
Notice of Allowance dated Aug. 28, 2018, which issued during the prosecution of U.S. Appl. No. 15/422,821.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No. 15/900,106.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Office Action dated Oct. 3, 2018, which issued during the prosecution of U.S. Appl. No. 15/280,195.
Office Action dated Jul. 6, 2018, which issued during the prosecution of U.S. Appl. No. 15/848,173.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Office Action dated Oct. 15, 2018, which issued during the prosecution of U.S. Appl. No. 15/619,012.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Sep. 24, 2018, which issued during the prosecution of U.S. Appl. No. 15/690,400.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Office Action dated Feb. 4, 2016 from U.S. Patent & Trademark Office in U.S. Appl. No. 14/753,227.
Notice of Allowance, dated Dec. 2, 2016, issued by the U.S. Patent and Trademark Office in U.S. Appl. No. 14/753,227.
Office Action dated Nov. 18, 2016 from U.S. Patent & Trademark Office in U.S. Appl. No. 14/753,227.
Office Action dated Aug. 15, 2016 from U.S. Patent & Trademark Office in U.S. Appl. No. 14/753,227.
Notice of Allowance, dated Jul. 12, 2017, issued by the U.S. Patent and Trademark Office in U.S. Appl. No. 15/388,864.
Office Action dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Aug. 3, 2018 from U.S. Patent & Trademark Office in U.S. Appl. No. 15/388,911.
Office Action dated May 30, 2018 from U.S. Patent & Trademark Office in U.S. Appl. No. 15/388,911.
Office Action dated Jun. 7, 2018 from U.S. Patent & Trademark Office in U.S. Appl. No. 15/380,309.
Office Action dated Nov. 16, 2016 which issued during the prosecution of U.S. Appl. No. 15/072,550.

(56) References Cited

OTHER PUBLICATIONS

Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.

Page 6

(56) References Cited

OTHER PUBLICATIONS

Office Action dated Mar. 19, 2019 in Japanese Application No. 2016-116261
Office Action dated Mar. 19, 2019 in Japanese Application No. 2016-124515
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
"Introduction to TMR Magnetic Sensors", Anonymous, Mar. 12, 2015, MR Sensor Technology, pp. 1-4 (Year: 2015).
Notice of Allowance dated Mar. 5, 2019 in U.S. Appl. No. 16/009,603.
Office Action dated Feb. 26, 2019 in Japanese Application No. 2016-123207.
Office Action dated Feb. 26, 2019 in U.S. Appl. No. 15/626,832.
Office Action dated Feb. 26, 2019 in U.S. Appl. No. 15/624,897.
Office Action dated Feb. 26, 2019 in U.S. Appl. No. 15/624,792.
Office Action dated Feb. 28, 2019 in U.S. Appl. No. 15/920,518.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Office Action dated Feb. 21, 2019 in U.S. Appl. No. 15/854,383.
Office Action dated Dec. 21, 2018 in U.S. Appl. No. 15/920,616.
Office Action dated Dec. 20, 2018 in U.S. Appl. No. 15/900,242.
Office Action dated Dec. 27, 2018 in U.S. Appl. No. 15/900,334.
Office Action dated Dec. 7, 2019 in U.S. Appl. No. 15/920,592.
Notice of Allowance dated Aug. 27, 2018 in U.S. Appl. No. 15/920,635.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated May 23, 2019 in U.S. Appl. No. 15/388,911.
Office Action dated Jun. 6, 2019 in U.S. Appl. No. 15/899,587.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821, Allowed.
U.S. Appl. No. 15/422,944, Allowed.
U.S. Appl. No. 15/466,143, Patented as U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/614,876, Allowed.
U.S. Appl. No. 15/620,916, Pending.
U.S. Appl. No. 15/621,464, Allowed.
U.S. Appl. No. 15/626,720, Allowed.
U.S. Appl. No. 15/854,383, Pending.
U.S. Appl. No. 15/854,507, Patented as U.S. Pat. No. 9,984,716.
U.S. Appl. No. 15/854,439, Pending.
U.S. Appl. No. 15/854,506, Patented as U.S. Pat. No. 10,008,230.
U.S. Appl. No. 15/848,173, Allowed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Allowed.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.
U.S. Appl. No. 15/464,991 Patented as U.S. Pat. No. 9,779,772.
U.S. Appl. No. 14/867,752, Patented as U.S. Pat. No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as U.S. Pat. No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Allowed.
U.S. Appl. No. 15/920,518, Pending.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).

(56) References Cited

OTHER PUBLICATIONS

U.S. Appl. No. 16/100,289, Allowed.
U.S. Appl. No. 16/038,669, Pending.
U.S. Appl. No. 15/900,106, Allowed.
U.S. Appl. No. 15/900,412, Patented as U.S. Pat. No. 10,062,403.
U.S. Appl. No. 15/900,141, Pending.
U.S. Appl. No. 15/900,160, Pending.
U.S. Appl. No. 15/900,345, Pending.
U.S. Appl. No. 15/900,379, Allowed.
U.S. Appl. No. 16/012,018, Pending.
U.S. Appl. No. 15/920,616, Pending.
U.S. Appl. No. 15/900,242, Allowed.
U.S. Appl. No. 15/900,334, Pending.
U.S. Appl. No. 15/920,592, Pending.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Pending.

\* cited by examiner

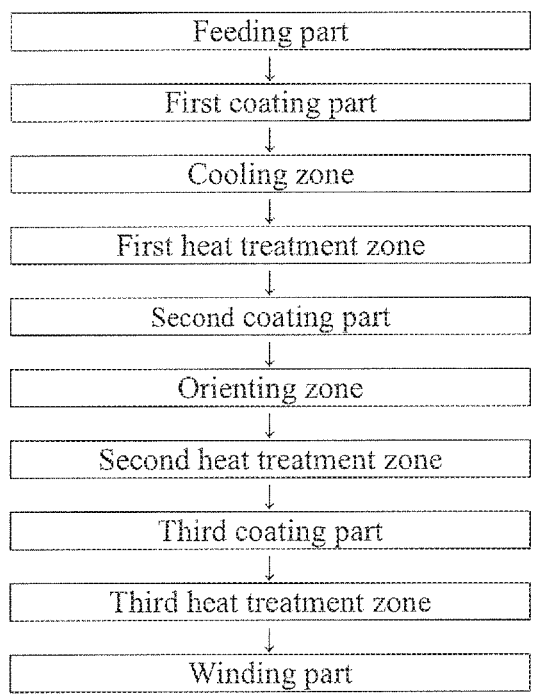

MAGNETIC TAPE INCLUDING CHARACTERIZED MAGNETIC LAYER, TAPE CARTRIDGE, RECORDING AND REPRODUCING DEVICE, AND METHOD OF MANUFACTURING

CROSS-REFERENCE TO RELATED APPLICATIONS

This application claims priority under 35 U.S.C 119 to Japanese Patent Application No. 2015-245145 filed on Dec. 16, 2015. The above application is hereby expressly incorporated by reference, in its entirety.

BACKGROUND OF THE INVENTION

Field of the Invention

The present invention relates to a magnetic tape, a magnetic tape cartridge, a magnetic recording and reproducing device, and a method of manufacturing a magnetic tape.

Discussion of the Background

Magnetic recording media include tape-shaped media and disk-shaped media. Magnetic recording media in the form of tapes, that is, magnetic tapes, are primarily employed in storage applications such as data-backup tapes.

When recording a signal on or reproducing a signal from a magnetic tape, a magnetic tape cartridge housing the magnetic tape is normally loaded into a drive, and the magnetic tape is run within the drive, bringing the surface of the magnetic tape (surface of the magnetic layer) into contact with (causing it to slide over) a magnetic head. Hereinafter, the term "magnetic tape" will also be referred to simply as a "tape" and the term "magnetic head" will also be referred to simply as a "head".

To increase the recording capacity of an individual magnetic tape cartridge, it is desirable to increase the overall length of the magnetic tape that is housed in each magnetic tape cartridge. To that end, efforts have been made to reduce the thickness of the magnetic tape (referred to as "reducing the thickness" hereinafter). An example of one way of reducing the thickness of the magnetic tape is to reduce the thickness of one or more layers contained in the magnetic tape. In this regard, Japanese Unexamined Patent Publication (KOKAI) No. 2011-48878 describes setting a magnetic layer thickness of less than or equal to 0.1 µm (Claim 1 of Japanese Unexamined Patent Publication (KOKAI) No. 2011-48878). The contents of Japanese Unexamined Patent Publication (KOKAI) No. 2011-48878 as well as English language family members US2011/052908A1 and U.S. Pat. No. 8,535,817 are expressly incorporated herein by reference in their entirety.

SUMMARY OF THE INVENTION

In a magnetic tape in which a nonmagnetic magnetic layer and a magnetic layer are sequentially present on a nonmagnetic support, an example of one way of reducing the thickness of the magnetic tape is to reduce the combined thickness of the nonmagnetic layer and the magnetic layer. For example, in an example in Japanese Unexamined Patent Publication (KOKAI) No. 2011-48878, a magnetic layer is provided on a nonmagnetic layer 1.0 µm in thickness (paragraph 0073 of Japanese Unexamined Patent Publication (KOKAI) No. 2011-48878). However, to achieve the ever higher recording capacities that have been demanded in recent years, it is desirable to reduce the thickness of the nonmagnetic layer and/or the magnetic layer, and further reduce the combined thickness of the nonmagnetic layer and magnetic layer.

In recent years, the running speed (also referred to as the "conveyance speed" hereinafter) during recording and/or reproduction of a magnetic signal on a magnetic tape has tended to increase. This increase in the conveyance speed shortens the time required to record and reproduce a unit length of magnetic tape. In this regard, increasing the conveyance speed to, for example, a relative speed between magnetic tape and head of greater than or equal to 7 m/sec, or even 8 m/sec, has been examined in recent years.

However, when the present inventor examined reducing the combined thickness of the nonmagnetic layer and magnetic layer in a magnetic tape sequentially having a nonmagnetic layer and magnetic layer on a nonmagnetic support, he found that particularly in magnetic tapes in which the combined thickness of the nonmagnetic layer and the magnetic layer had been reduced to less than or equal to 0.60 µm, electromagnetic characteristics with repeated high-speed conveyance would deteriorate.

An aspect of the present invention provides for a magnetic tape in which the combined thickness of the nonmagnetic layer and magnetic layer is less than or equal to 0.60 µm, that can exhibit good electromagnetic characteristics even with repeated high-speed conveyance.

An aspect of the present invention relates to the following magnetic tape:

a magnetic tape having a nonmagnetic layer containing nonmagnetic powder and binder on a nonmagnetic support, and a magnetic layer containing ferromagnetic powder and binder on the nonmagnetic layer; wherein the combined thickness of the nonmagnetic layer and the magnetic layer is less than or equal to 0.60 µm;

the coefficient of friction as measured on the base portion of the surface of the magnetic layer is less than or equal to 0.35;

at least the magnetic layer contains one or more components selected from the group consisting of a fatty acid and a fatty acid amide; and a C—H derived carbon, C, concentration calculated from a C—H peak area ratio in a C1s spectrum obtained by X-ray photoelectron spectroscopy conducted at a photoelectron take-off angle of 10 degrees on the surface of the magnetic layer is greater than or equal to 45 atom %.

Although the combined thickness of the nonmagnetic layer and the magnetic layer in this magnetic tape is reduced to less than or equal to 0.60 µm, it can afford good electromagnetic characteristics even with repeated conveyance.

The "base portion" as referred to in the present invention is the portion of the surface of the magnetic layer specified by the following method.

Defining the plane where the volumes of protruding components and indenting components equal out in the field of view as measured by an atomic force microscope (AFM) as the reference plane, protrusions are defined as protrusions greater than or equal to 15 nm in height from the reference plane. The portion where the number of protrusions greater than or equal to 15 nm in height from the reference plane is zero, that is, the portion where no protrusions greater than or equal to 15 nm in height from the reference plane are detected on the surface of the magnetic layer, is specified as the base portion.

The coefficient of friction that is measured on the base portion refers to the value that is measured by the following method.

On the base portion (measurement spot: a 10 μm length in the longitudinal direction of a magnetic tape), a spherical indenter made of diamond that is 1 μm in radius is passed back and forth once at a load of 100 μN and at a speed of 1 μm/s to measure the frictional force (horizontal force) and normal force. The frictional force and normal force that are measured are arithmetic averages obtained by constantly measuring the frictional force and normal force during one back and forth pass. This measurement can be conducted, for example, with a model TI-95 Triboindenter made by Hysitron Corp. The μ value of the coefficient of friction is calculated from the arithmetic average of the frictional force and the arithmetic average of the normal force that are measured. The coefficient of friction is a value that is obtained from the equation: $F=\mu N$ from the frictional force (horizontal force) F (unit: Newtons (N)) and the normal force N (unit: Newtons (N)). The above measurement and calculation of coefficient of friction μ value is conducted for three portions of the base portion randomly determined on the surface of the magnetic layer and the arithmetic average of the three measured values obtained is adopted as the coefficient of friction measured on the base portion. The coefficient of friction measured on the base portion will also be referred to as the "base portion friction" below.

X-ray photoelectron spectroscopy is an analysis method that is commonly referred to as electron spectroscopy for chemical analysis (ESCA) or X-ray photoelectron spectroscopy (XPS). Hereinafter, X-ray photoelectron spectroscopy will also be referred to as ESCA. ESCA is an analysis method that exploits the fact that photoelectrons are released when the surface of a sample being measured is irradiated with X-rays. It is widely employed as an analysis method for the surface layer portions of samples being measured. ESCA makes it possible to employ the X-ray photoelectron spectrum obtained by analysis of the surface of a sample being measured to conduct qualitative and quantitative analysis. Within the depth from the outer surface of the sample to the analysis position (also referred to hereinafter as the "detection depth") and the photoelectron take-off angle, the following equation generally holds true: detection depth is nearly equal to ≈ (nearly equal to) average free path of electrons×3×sin θ. In the equation, the detection depth is the depth at which 95% of the photoelectrons constituting the X-ray photoelectron spectrum are generated and θ is the photoelectron take-off angle. From the above equation, it will be understood that the smaller the photoelectron take-off angle, the shallower the depth from the sample surface that can be analyzed, and the larger the photoelectron take-off angle, the deeper the depth from the surface that can be analyzed. In analysis by ESCA at a photoelectron take-off angle of 10 degrees, a surface layer portion of only several nm in depth from the surface of the sample is normally the position analyzed. Accordingly, analysis by ESCA conducted at a photoelectron take-off angle of 10 degrees on the magnetic layer surface of the magnetic tape permits compositional analysis of an extreme outer layer portion of only about several nm in depth from the magnetic layer surface.

Additionally, the C—H derived C concentration is the proportion that carbon atoms C constituting C—H bonds account for relative to the 100 atom % of the total (based on atoms) of all elements detected by qualitative analysis by ESCA. In the above magnetic tape, at least one component selected from the group consisting of a fatty acid and a fatty acid amide is contained in at least the magnetic layer. The fatty acid and fatty acid amide are both components that can function as lubricants in magnetic tapes. In a magnetic tape containing at least one of the fatty acid and the fatty acid amide in at least the magnetic layer, the C concentration derived from C—H determined by analysis by ESCA at a photoelectron take-off angle of 10 degrees is thought by the present inventor to be an indicator of the quantity of component (at least one component selected from the group consisting of a fatty acid and a fatty acid amide) on the extreme outer layer portion of the magnetic layer. This will be described in detail below.

In an X-ray photoelectron spectrum (X-axis: bond energy; Y-axis: strength) obtained by ESCA analysis, the C1s spectrum contains information about the energy peak of the is orbital of carbon atoms C. In the C1s spectrum, the peak located in the vicinity of a bond energy of 284.6 eV is the C—H peak. This C—H peak is derived from the bond energy of the C—H bonds of organic compounds. In the extreme outer portion of the magnetic layer containing at least one component selected from the group consisting of a fatty acid and a fatty acid amide, the present inventor presumes that the main constituent component of the C—H peak is the component selected from the group consisting of a fatty acid and a fatty acid amide. The present inventor thus assumes that it can serve as an indicator of the quantity that is present, as set forth above.

The C—H derived concentration calculated from the C—H peak area ratio in the C1s spectrum obtained by X-ray photoelectron spectroscopy conducted at a photoelectron take-off angle of 10 degrees will also be denoted hereinafter as the "outer layer portion C—H derived C concentration".

The present inventor presumes the following with respect to the above magnetic tape, although not intended to limit the present invention in any way.

(1) The present inventor presumes the following with respect to the base portion friction.

As stated above, a magnetic tape is normally run within a drive so that the surface of the magnetic tape (magnetic layer surface) and a magnetic head come into contact (slide against each other) when recording and/or reproducing a signal on a magnetic tape. The greater the combined thickness of the nonmagnetic layer and the magnetic layer of the magnetic tape, the lower the frequency of contact between the portion of the magnetic layer surface coming into contact with the head (the actual contact portion), primarily the protrusions described in reference to the base portion, is thought to become. By contrast, when the combined thickness of the nonmagnetic layer and the magnetic layer decreases to less than or equal to 0.60 μm, the present inventor presumes that the strength of the magnetic tape would decrease and the magnetic tape tends to become flexible, with contact (actual contact) between the magnetic head and the base portion tending to occur during high-speed conveyance. As a result, the effect of the coefficient of friction of the base portion on the sliding property between the surface of the magnetic layer and the head increases. The present inventor presumes that the greater the coefficient of friction of the base portion becomes, the greater the decrease in the sliding property (the more difficult smooth sliding becomes) that occurs, causing a drop in the electromagnetic characteristics with repeated high-speed conveyance. Conversely, the present inventor presumes that reducing the coefficient of friction measured in the base portion of the surface of the magnetic layer to less than or equal to 0.35 can enhance the sliding property, which can contribute to inhibiting a drop in the electromagnetic characteristics with repeated high-speed conveyance in a magnetic tape in which the combined thickness of the nonmagnetic layer and the magnetic layer is less than or equal to 0.60 μm.

(2) The present inventor further presumes that having an "outer layer portion C—H derived C concentration of the above magnetic tape of greater than or equal to 45 atom % can also contribute to achieving good electromagnetic characteristics even with repeated high-speed running in a magnetic tape in which the combined thickness of the nonmagnetic layer and magnetic layer has been reduced to less than or equal to 0.60 μm. The present inventor presumes that in a magnetic tape containing at least one component selected from the group consisting of a fatty acid and a fatty acid amide in at least the magnetic layer, this can be due to an improved sliding property resulting from the presence of the one or more components selected from the group consisting of a fatty acid and a fatty acid amide in the extreme outer layer portion of the magnetic layer in a greater quantity than is the case in a conventional magnetic tape.

The above are presumptions by the present inventor about the reasons for which the above magnetic tape can exhibit good electromagnetic characteristics even with repeated high-speed conveyance despite being a magnetic tape in which the combined thickness of the nonmagnetic layer and the magnetic layer is thin, less than or equal to 0.60 μm. However, the above are merely presumptions, and are not intended to limit the present invention in any way.

In one embodiment, the above C—H derived C concentration falls within a range of 45 to 80 atom %.

In one embodiment, the above C—H derived C concentration falls within a range of 45 to 70 atom %.

In one embodiment, the magnetic layer and the nonmagnetic layer each contain one or more components selected from the group consisting of a fatty acid and a fatty acid amide.

In one embodiment, the above magnetic tape has a backcoat layer containing nonmagnetic powder and binder on the opposite side of the nonmagnetic support from the side on which the nonmagnetic layer and magnetic layer are present.

In one embodiment, the total thickness of the magnetic tape is less than or equal to 6.00 μm.

In one embodiment, the above ferromagnetic powder is selected from the group consisting of ferromagnetic hexagonal ferrite powder and ferromagnetic metal powder.

A further aspect of the present invention relates to a magnetic tape cartridge housing the above magnetic tape.

In one embodiment, the total length of the magnetic tape that is housed in the magnetic tape cartridge is greater than or equal to 10 m.

A still further aspect of the present invention relates to a magnetic recording and reproducing device including the above magnetic tape cartridge and a magnetic head.

In one embodiment, the relative speed of the magnetic tape and the magnetic head during the recording, reproduction, or recording and reproduction, of a magnetic signal on the magnetic tape housed in the above magnetic tape cartridge is greater than or equal to 7 m/sec.

A further aspect of the present invention relates to a method of manufacturing the above magnetic tape, including forming a nonmagnetic layer and forming a magnetic layer wherein:

the forming of a nonmagnetic layer includes:
forming a coating layer by coating on a nonmagnetic support a nonmagnetic layer forming composition containing one or more components selected from the group consisting of a fatty acid and a fatty acid amide, nonmagnetic powder, binder, and solvent, and drying the coating layer by a heat treatment,
with cooling the coating layer being conducted between the coating and the drying by a heat treatment.

In one embodiment, the cooling is conducted by placing the coating layer in a cooling atmosphere of −10° C. to 0° C.

In one embodiment, the solvent that is contained in the nonmagnetic layer forming composition contains ketone solvent.

In one embodiment, the forming of a magnetic layer includes forming a coating layer by coating on a nonmagnetic layer a magnetic layer forming composition containing ferromagnetic powder, binder, and solvent, and
drying the coating layer by a heat treatment.

In one embodiment, the magnetic layer forming composition further contains one or more components selected from the group consisting of a fatty acid and a fatty acid amide.

In one embodiment, either one or both of the nonmagnetic layer forming composition and the magnetic layer forming composition further contain a fatty acid ester.

An aspect of the present invention can provide a magnetic tape that affords good electromagnetic characteristics even with repeated high-speed conveyance and in which the combined thickness of the nonmagnetic layer and the magnetic layer is less than or equal to 0.60 μm.

Yet another aspect of the present invention can provide a magnetic tape cartridge housing such a magnetic tape, and a magnetic recording and reproducing device equipped with this magnetic tape cartridge.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein:

FIG. 1 shows an example (a schematic process diagram) of a specific embodiment of the process of manufacturing a magnetic tape.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Tape

An aspect of the present invention relates to a magnetic tape having a nonmagnetic layer containing nonmagnetic powder and binder on a nonmagnetic support and having a magnetic layer containing ferromagnetic powder and binder on the nonmagnetic layer, wherein the combined thickness of the nonmagnetic layer and magnetic layer is less than or equal to 0.60 μm, the coefficient of friction as measured on the base portion of the surface of the magnetic layer (base portion friction) is less than or equal to 0.35, at least the magnetic layer contains one or more components selected from the group consisting of a fatty acid and a fatty acid amide, and a C—H derived carbon, C, concentration calculated from a C—H peak area ratio in a C1s spectrum obtained by X-ray photoelectron spectroscopy conducted at a photoelectron take-off angle of 10 degrees on the surface of the magnetic layer (outer layer portion C—H derived C concentration) is greater than or equal to 45 atom %.

The above magnetic tape will be described in greater detail below.

<Base Portion Friction>

The coefficient of friction (base portion friction) measured on the base portion of the surface of the magnetic layer of the above magnetic tape is less than or equal to 0.35. The method of measuring the base portion friction is as set forth above. From the perspective of further inhibiting a drop in the electromagnetic characteristics with repeated high-speed conveyance, the base portion friction is desirably less than or equal to 0.33, preferably less than or equal to 0.30. The base portion friction is, for example, greater than or equal to 0.10 or greater than or equal to 0.20. However, from the perspective of inhibiting a drop in the electromagnetic characteristics with repeated high-speed conveyance, the lower it is the better. Thus, no lower limit is specified.

The reason for defining protrusions that are greater than or equal to 15 nm in height above a reference surface as protrusions in the method of measuring the base portion friction set forth above is that the protrusions that are commonly recognized as protrusions present on the surface of the magnetic layer are mainly protrusions greater than or equal to 15 nm in height above the reference surface. Such protrusions are formed on the surface of the magnetic layer by, for example, the nonmagnetic filler described further below. By contrast, the present inventor presumes that irregularities that are even more microscopic than the irregularities due to such protrusions are present on the surface of the magnetic layer. The present inventor presumes that the base portion friction can be adjusted by controlling the shape of these microscopic irregularities. Based on this presumption, the present inventor formed a magnetic layer using two or more kinds of ferromagnetic powder with different average particle sizes to control the shape of the irregularities of the base portion. As a result, it was possible to control the base portion friction to various values. Accordingly, an example of one way of adjusting the base portion friction is to use two or more kinds of ferromagnetic powder with different average particle sizes as ferromagnetic powder. More specifically, the present inventors assume that it is possible to form the above microscopic irregularities on the base portion by means of protrusions in the form of ferromagnetic powder of large average particle size, and that it is possible to increase the abundance of protrusions on the base portion by increasing the mixing ratio of ferromagnetic powder of larger average particle size (and conversely, to lower the abundance of protrusions on the base portion by decreasing the mixing ratio). This will be described in greater detail further below.

As another way, the present inventor formed a magnetic layer using additional nonmagnetic powder with an average particle size greater than that of the ferromagnetic powder together with the nonmagnetic powder capable of forming protrusions by protruding from the surface of the magnetic layer as set forth above to control the shape of irregularities on the base portion. They were thus able to control the base portion friction to various values. Accordingly, another example of a way of adjusting the base portion friction is to use this additional nonmagnetic powder when forming the magnetic layer. More specifically, the present inventor assumes that the additional nonmagnetic powder becomes protrusions that form the above microscopic irregularities on the base portion, and that by increasing the mixing ratio of such nonmagnetic powder, it is possible to increase the abundance of protrusions on the base portion (and conversely, to lower the abundance of protrusions on the base portion by decreasing the mixing ratio). This will be described in greater detail further below.

Additionally, it is possible to adjust the base portion friction by combining the above two methods.

However, the above adjustment methods are examples. Any means of adjustment can be used to achieve a base portion friction of less than or equal to 0.35, and such embodiments are included in the present invention.

<Outer Layer Portion C—H Derived C Concentration>

The outer layer portion C—H derived C concentration of the above magnetic tape is greater than or equal to 45 atom %. From the perspective of further inhibiting a drop in the electromagnetic characteristics with repeated high-speed conveyance, it is desirably greater than or equal to 48 atom %, preferably greater than or equal to 50 atom %, more preferably greater than or equal to 55 atom %, and even more preferably, greater than or equal to 60 atom %. Research by the present inventor has revealed a trend whereby, from the perspective of inhibiting a drop in the electromagnetic characteristics with repeated high-speed conveyance, the higher the outer layer portion C—H derived C concentration, the better. Accordingly, no upper limit is set for the outer layer portion C—H derived C concentration. As an example, the upper limit can be less than or equal to 95 atom %, less than or equal to 90 atom %, less than or equal to 85 atom %, less than or equal to 80 atom %, or less than or equal to 70 atom %.

As set forth above, the outer layer portion C—H derived C concentration is a value that is determined by analysis by ESCA. The region analyzed is any 300 μm×700 μm region located on the surface on the magnetic layer side of the magnetic tape. Qualitative analysis is conducted by wide scan measurement (pass energy: 160 eV; scan range: 0 to 1,200 eV; energy resolution: 1 eV/step) by ESCA. Next, the spectra of all the elements detected by qualitative analysis are subjected to narrow scan measurement (pass energy: 80 eV, energy resolution: 0.1 eV; scan range: set for each element so that the entire spectrum measured fits). The atomic concentration (unit: atom %) of each element is then calculated from the peak areas in the various spectra obtained. The atomic concentration (C concentration) of carbon atoms is then calculated from the peak area of the C1s spectrum.

Furthermore, C1s spectrum are obtained (pass energy: 10 eV; scan range: 276 eV to 296 eV; energy resolution: 0.1 eV/step). Fitting is conducted for the C1s spectrum by the nonlinear least squares method with Gauss-Lorentz complex function (Gauss component 70%, Lorentz component 30%). The proportion of the C—H peak accounted for by the C1s spectrum (peak area ratio) is calculated. The calculated C—H peak area ratio is multiplied by the above C to calculate the C—H derived C concentration.

The arithmetic average of values obtained by conducting the above processing at three different positions on the surface of the magnetic layer is then adopted as the outer layer portion C—H derived C concentration. The specific form of the above processing is given in Examples further below.

An example of a desirable means of adjusting the outer layer portion C—H derived C concentration to greater than or equal to 45 atom % is to conduct a cooling step in the step of forming the nonmagnetic layer, described in detail further below. However, the magnetic tape according to an aspect of the present invention is not limited to tapes manufactured with such a cooling step.

The various components contained in the magnetic layer and/or nonmagnetic layer of the above magnetic tape will be described next in greater detail.

<Ferromagnetic Powder>

As set forth above, one way to adjust the base portion friction is control with the ferromagnetic powder. The various powders that are commonly employed as ferromagnetic powders in the magnetic layers of magnetic tapes can be employed as the ferromagnetic powder contained in the magnetic layer of the above magnetic tape.

For example, from the perspective of enhancing the recording density of the magnetic tape, it is desirable to employ a ferromagnetic powder with a small average particle size as the ferromagnetic powder employed in the greatest proportion in the magnetic layer. From this perspective, when employing ferromagnetic powders in the magnetic layer in the form of two or more kinds of ferromagnetic powder of differing average particle size, it is desirable to employ ferromagnetic powder with an average particle size of less than or equal to 50 nm as the ferromagnetic powder employed in the greatest proportion. From the perspective of stable magnetization, the average particle size of the ferromagnetic powder employed in the greatest proportion is desirably greater than or equal to 10 nm. When not employing two or more kinds of ferromagnetic powder of differing average particle size, but rather one ferromagnetic powder, the average particle size of the ferromagnetic powder employed is desirably less than or equal to 50 nm, and desirably less than or equal to 10 nm, for the above reasons.

By contrast, the ferromagnetic powder that is employed along with the ferromagnetic powder employed in the greatest proportion desirably has an average particle size that is greater than that of the ferromagnetic powder that is employed in the greatest proportion. That is because it is assumed that protrusions formed on the base portion by ferromagnetic powder of large average particle size can reduce the base portion friction. From this perspective, the difference between the average particle size of the ferromagnetic powder employed in the greatest proportion and the average particle size of the ferromagnetic powder employed with it, denoted as the "(average particle size of the latter)–(average particle size of the former)", desirably falls within a range of 10 to 80 nm, preferably falls within a range of 10 to 50 nm, more preferably falls within a range of 10 to 40 nm, and still more preferably, falls within a range of 12 to 35 nm. It is also naturally possible to employ two or more kinds of ferromagnetic powder of differing average particle size as the ferromagnetic powder that is employed with the ferromagnetic powder employed in the greatest proportion. In that case, the average particle size of at least one of the two or more kinds of ferromagnetic powder desirably satisfies the above difference with the average particle size of the ferromagnetic powder employed in the greatest proportion. It is desirable for the average particle sizes of more of the ferromagnetic powders to satisfy this difference, and preferably for all of the average particle sizes of the ferromagnetic powders to satisfy this difference.

From the perspective of controlling the base portion friction, it is desirable for the mixing ratio of the ferromagnetic powder employed in the greatest proportion to the additional ferromagnetic powder (when two or more kinds of additional ferromagnetic powder with differing average particle size are employed, the combined total thereof) to fall within a range based on weight of former:latter=90.0:10.0 to 99.9:0.1, preferably within a range of 95.0:5.0 to 99.5:0.5, with regard to two or more kinds of ferromagnetic powder of differing average particle size.

The term "ferromagnetic powders with differing average particle size" refers to all or some part of the ferromagnetic powder lot having different average particle sizes. A particle size distribution based on volume or based on number of ferromagnetic powder contained in the magnetic layer of a magnetic tape formed using ferromagnetic powders with differing average particle sizes in this manner can be measured by a known measurement method such as the dynamic light scattering method or laser diffraction. When this is done, at the average particle size of the ferromagnetic powder employed in the greatest proportion, or in the vicinity thereof, a maximum peak will normally be found in the particle size distribution curve obtained by measurement. There will also be cases where a peak will be found at the average particle size of various ferromagnetic particles or in the vicinity thereof. Accordingly, when measuring the particle size distribution of ferromagnetic powder contained in the magnetic layer of a magnetic tape formed using the ferromagnetic powder with an average particle size of 10 nm to 50 nm, for example, in the greatest proportion, a maximum peak will normally be found within the particle size range of 10 nm to 50 nm in the particle size distribution curve.

A portion of the above additional ferromagnetic powder can be replaced with nonmagnetic powder, described further below.

The average particle size of the ferromagnetic powder in the present invention and the present specification is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present specification, the average particle size of the powder, such as ferromagnetic powder and various kinds of powder, is the average particle size as obtained by the above method, unless otherwise stated. The average particle size indicated in Examples further below was obtained using a Model H-9000 transmission electron microscope made by Hitachi and KS-400 image analysis software made by Carl Zeiss. In the present invention and the present specification, the term "ferromagnetic powder" means a collection of multiple ferromagnetic particles. The term "collection" is not limited to a form in which the constituent particles are in direct contact, but includes forms in which the binder, additives, and the like described further below are present between the particles. The term "particles" is also sometimes used to denote powder. The above is also applied to the various powders, such as nonmagnetic powder, in the present invention and the present specification.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and the present specification, the size of the particles constituting powder such as ferromagnetic powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the ferromagnetic powder is ferromagnetic hexagonal ferrite powder. When the ferromagnetic powder employed in the greatest proportion is ferromagnetic hexagonal ferrite powder, the average particle size (for example, average plate diameter), from the perspective of achieving high density recording and stable magnetization, is desirably greater than or equal to 10 nm but less than or equal to 50 nm, preferably greater than or equal to 20 nm but less than or equal to 50 nm. Reference can be made, for example, to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is a specific example of desirable ferromagnetic powder. When the ferromagnetic powder that is employed in the greatest proportion is ferromagnetic metal powder, the average particle size thereof (for example, average major axis length), from the perspective of achieving higher density recording and stable magnetization, is desirably greater than or equal to 10 nm but less than or equal to 50 nm, preferably greater than or equal to 20 nm but less than or equal to 50 nm. Reference can be made, for example, to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powders. The contents of the above publications are expressly incorporated herein by reference in their entirety.

The above magnetic tape can contain ferromagnetic powder in the form of ferromagnetic hexagonal ferrite powder alone, ferromagnetic metal powder alone, or both.

The content (fill rate) of ferromagnetic powder in the magnetic layer desirably falls within a range of 50 to 90 weight percent, preferably within a range of 60 to 90 weight percent. A high fill rate is desirable from the perspective of raising the recording density.

<Fatty Acid and Fatty Acid Amide>

The above magnetic tape contains at least one component selected from the group consisting of a fatty acid and a fatty acid amide in at least the magnetic layer. Just a fatty acid or just a fatty acid amide can be contained in the magnetic layer, or both can be contained. As set forth above, the present inventor assumes that causing a large amount of these components to be present on the extreme outer layer portion of the magnetic layer can contribute to inhibiting a drop in the electromagnetic characteristics with repeated high-speed conveyance of a magnetic tape with a combined thickness of the magnetic layer and the nonmagnetic layer that has been reduced to less than or equal to 0.60 μm. One or more components selected from the group consisting of a fatty acid and a fatty acid amide can also be contained in the nonmagnetic layer.

Examples of the fatty acid are lauric acid, myristic acid, palmitic acid, stearic acid, oleic acid, linoleic acid, linolenic acid, behenic acid, erucic acid, and elaidic acid. Stearic acid, myristic acid, and palmitic acid are desirable, and stearic acid is preferred. The fatty acid can also be incorporated into the magnetic layer in the form of salts such as metal salts.

Examples of the fatty acid amide are amides of various fatty acids, such as amide laurate, amide myristate, amide palmitate, and amide stearate.

For the fatty acid and fatty acid derivatives (amides, esters described further below, and the like), the fatty acid derived moiety of a fatty acid derivative desirably has a structure that is identical or similar to that of the fatty acid which is employed together. As an example, when employing stearic acid as a fatty acid, it is desirable to employ amide stearate and/or stearic acid ester.

The quantity of fatty acid can be, for example 0.1 to 10.0 weight parts, desirably 1.0 to 7.0 weight parts, per 100.0 weight parts of ferromagnetic powder as the content in the magnetic layer forming composition. When two or more different fatty acids are added to the magnetic layer forming composition, the content refers to the combined content thereof. Unless specifically stated otherwise, this similarly applies to the contents of other components in the present invention and the present specification.

The content of fatty acid amide in the magnetic layer forming composition can be, for example, 0.1 to 3.0 weight parts, desirably 0.1 to 1.0 weight parts, per 100.0 weight parts of ferromagnetic powder.

Additionally, the fatty acid content in the nonmagnetic layer forming composition is, for example, 1.0 to 10.0 weight parts, desirably 1.0 to 7.0 weight parts, per 100.0 weight parts of nonmagnetic powder. The content of fatty acid amide in the nonmagnetic layer forming composition is, for example, 0.1 to 3.0 weight parts, desirably 0.1 to 1.0 weight parts, per 100.0 weight parts of nonmagnetic powder.

<Fatty Acid Ester>

A fatty acid ester can be optionally contained in either, or both, the magnetic layer and the nonmagnetic layer, described in detail further below. A fatty acid ester, a fatty acid, and a fatty acid amide are all components that can function as lubricants. However, the present inventor presumes that components selected from the group consisting of a fatty acid and a fatty acid amide can contribute to inhibiting a drop in the electromagnetic characteristics with repeated high-speed conveyance of a magnetic tape in which the combined thickness of the nonmagnetic layer and magnetic layer is less than or equal to 0.6 µm, and that a fatty acid ester does not have an effect (or has only a slight effect). Lubricants can generally be divided into fluid lubricants and boundary lubricants. A fatty acid ester is thought to be components that can function as fluid lubricants, while a fatty acid and a fatty acid amide are thought to be lubricants that can function as boundary lubricants. Boundary lubricants are thought to adsorb to the surface of powder (such as ferromagnetic powder) and form a strong lubricating film, thereby reducing contact friction. Conversely, fluid lubricants are thought to form a liquid film on the surface of the magnetic layer, reducing friction by the flowing of this liquid film. The present inventor presumes that the fact that the lubricating action of a fatty acid ester differs from that of a fatty acid and a fatty acid amide in this manner is why a fatty acid ester would affect inhibiting the lowering of the electromagnetic characteristics differently than a fatty acid and a fatty acid amide. Since a fatty acid ester is generally thought to be lubricant that can contribute to enhancing the running durability of a magnetic tape, it can be incorporated into either, or both, the magnetic layer and the nonmagnetic layer, described in detail further below, to enhance scratch resistance, for example.

Examples of the fatty acid ester are esters of the various fatty acids set forth above, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The quantity of fatty acid ester is, for example, 0 to 10.0 weight parts, desirably 1.0 to 7.0 weight parts, per 100.0 weight parts of ferromagnetic powder as the content in the magnetic layer forming composition.

The content of fatty acid ester in the nonmagnetic layer forming composition is, for example, 0 to 10.0 weight parts, desirably 1.0 to 7.0 weight parts, per 100.0 weight parts of nonmagnetic powder.

The magnetic layer, nonmagnetic layer, and the like of the above magnetic tape will be described next in greater detail.

<Magnetic Layer>

(Ferromagnetic Powder)

The ferromagnetic powder contained in the magnetic layer is as set forth above.

(Binder, Curing Agent)

The above magnetic tape is a particulate magnetic tape that contains binder along with ferromagnetic powder in the magnetic layer. The various resins that are commonly employed as binders in particulate magnetic recording media can be employed as binders. For example, polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer and the backcoat layer described further below. Reference can be made to paragraphs 0028 to 0031 of Japanese Unexamined Patent Publication (KOKAI) No. 2010-24113, which is expressly incorporated herein by reference in its entirety, with regard to the above binders. The average molecular weight of the resin that is employed as binder, given as a weight average molecular weight, is by way of example greater than or equal to 10,000 but less than or equal to 200,000. In the present invention and the present specification, the term "weight average molecular weight" is a value measured by gel permeation chromatography (GPC) and converted to a polystyrene equivalent. An example of measurement conditions is given below. The weight average molecular weights given in Examples below are values measured under the following conditions and converted to polystyrene equivalents.

GPC device: HLC-8120 (made by Tosoh)

Column: TSK gel Multipore HXL-M (7.8 mm ID (inner diameter)×30.0 cm, made by Tosoh)

Eluent: Tetrahydrofuran (THF)

A curing agent can be employed with the above resin suitable for use as the binder. In one embodiment, the curing agent is a thermosetting compound in the form of a compound undergoing a curing reaction (crosslinking reaction) when heated. In another embodiment, it is a light-curable compound undergoing a curing reaction (crosslinking reaction) when irradiated with light. A thermosetting compound is desirable as curing agent, and polyisocyanate is suitable. For details relating to polyisocyanate, reference can be made to Japanese Unexamined Patent Publication (KOKAI) No. 2011-216149, paragraphs 0124 and 0125. The content of curing agent in the magnetic layer forming composition is, for example, 0 to 80.0 weight parts, and from the perspective of enhancing the coating strength, desirably falls within a range of 50.0 to 80.0 weight parts, per 100.0 weight parts of binder.

(Additives)

Ferromagnetic powder and binder are contained in the magnetic layer, and as needed, one or more additives can be incorporated. The above curing agent is an example of an additive. At least some portion of the curing agent can be contained in the magnetic layer in a state of having reacted (crosslinked) with another component, such as the binder due to the curing reaction that has been promoted in the process of forming the magnetic layer. Examples of additives that can be contained in the magnetic layer are nonmagnetic filler, lubricants, dispersing agents, dispersion adjuvants, antifungal agents, antistatic agents, oxidation inhibitors, and carbon black. The additives can be suitably selected for use from among commercial products based on the desired properties.

Nonmagnetic filler as one form of an additive will be described below. However, the present invention is not limited to this form.

——Nonmagnetic Filler——

One or more nonmagnetic fillers are desirably incorporated into the magnetic layer. The term "nonmagnetic filler" is synonymous with nonmagnetic powder. Examples of nonmagnetic fillers are nonmagnetic fillers (referred to hereinafter as "protrusion-forming agents") that are capable of functioning as protrusion-forming agents that form protrusions suitably protruding from the surface of the magnetic layer, and nonmagnetic fillers (referred to hereinafter as "abrasives") that are capable of functioning as abrasives. Protrusion-forming agents are components that can contribute to controlling the friction characteristics of the surface of the magnetic layer. Additionally, abrasives are components that are capable of imparting an abrasive capacity to the surface of the magnetic layer to remove deposits that have adhered to the head. It is desirable to incorporate at least either a protrusion-forming agent or an abrasive into the magnetic layer of the magnetic tape, and preferable to incorporate both. Protrusions 15 nm or greater in height relative to the reference surface described for the method of measuring the base portion friction above are thought to be comprised of protrusions formed primarily by protrusion-forming agents and/or abrasives.

Various nonmagnetic fillers that are normally employed as a protrusion-forming agent can be employed as a protrusion-forming agent. The protrusion-forming agent can be an inorganic or organic substance. In one embodiment, from the perspective of achieving a uniform friction characteristic, the particle size distribution of the protrusion-forming agent is desirably that of a monodispersion exhibiting a single peak, and not that of a multiple dispersion exhibiting a distribution with multiple peaks. From the perspective of the availability of monodisperse particles, nonmagnetic powder in the form of powder of an inorganic substance is desirable. Examples of powders of inorganic substances are various powders of metal oxides, metal carbonates, metal sulfates, metal nitrides, metal carbides, and metal sulfides. Inorganic oxide powders are desirable. The protrusion-forming agent is preferably a colloidal particle, more preferably an inorganic oxide colloidal particle. From the perspective of the availability of monodisperse particles, the inorganic oxide constituting the inorganic oxide colloidal particles is desirably silicon dioxide (silica). The inorganic oxide colloidal particles are preferably colloidal silica (silica colloid particles). In the present invention and the present specification, the term "colloidal particles" refers to particles that are capable of dispersing to yield a colloidal dispersion without precipitating, when added in a quantity of 1 g per 100 mL to at least one organic solvent in the form of at least methyl ethyl ketone, cyclohexanone, toluene, or ethyl acetate, or a mixed solvent containing two or more of these solvents in any blending ratio. The average particle size of the colloidal particles is a value that is determined by the method set forth as an average particle diameter measurement method in Japanese Unexamined Patent Publication (KOKAI) No. 2011-048878, paragraph 0015. The content of the above publication is expressly incorporated herein by reference in its entirety. In another embodiment, the protrusion-forming agent is desirably carbon black.

The average particle size of the protrusion-forming agent is, for example, 30 nm to 300 nm, desirably 40 nm to 200 nm.

Examples of abrasive are various powder of substance normally employed as an abrasive in the magnetic layer, such as alumina ($Al_2O_3$), silicon carbide, boron carbide ($B_4C$), $SiO_2$, TiC, cerium oxide ($Cr_2O_3$), zirconium oxide ($ZrO_2$), iron oxide, and diamond powder. Of these, powder of alumina such as α-alumina and silocon carbide powder are desirable. Additionally, the specific surface area can be employed as an indicator of the size of particles. The specific surface area of abrasibe is, for example, greater than or equal to 14 $m^2/g$, desirably greater than or equal to 16 $m^2/g$, and preferably greater than or equal to 18 $m^2/g$. The specific surface area of abrasibe is, for example, less than or equal to 40 $m^2/g$. The term "specific surface area" is a value that is obtained by measuring primary particles by the nitrogen adsorption method (also known as the Brunauer-Emmett-Teller (BET) single-point method). The specific surface area obtained by such a method will also be referred to hereinafter as the BET specific surface area.

From the perspective of getting the protrusion forming agent and/or abrasive to more properly carry out its function, the content of the protrusion forming agent in the magnetic layer is desirably 1.0 to 4.0 weight parts, preferably 1.5 to 3.5 weight parts, per 100.0 weight parts of ferromagnetic powder. The content of abrasive in the magnetic layer is desirably 1.0 to 20.0 weight parts, preferably 3.0 to 15.0 weight parts, and more preferably, 4.0 to 10.0 weight parts per 100.0 weight parts of ferromagnetic powder.

As an example of an additive that can be employed in a magnetic layer containing an abrasive, the dispersing agent described in Japanese Unexamined Patent Publication (KOKAI) No. 2013-131285, paragraphs 0012 to 0022, is an example of a dispersing agent for enhancing the dispersion of an abrasive. The content of the above publication is expressly incorporated herein by reference in its entirety.

——Additional Nonmagnetic Powder——

Additional nonmagnetic powder can be employed in addition to the nonmagnetic filler set forth above to control the base material friction to less than or equal to 0.35. Such nonmagnetic powder desirably have a Mohs hardness of less than or equal to 8. Various nonmagnetic powders that are commonly employed in nonmagnetic layers can be employed. Details are as set forth further below with regard to the nonmagnetic layer. Colcothar is a preferred example of additional nonmagnetic powder. Colcothar has a Mohs hardness of about 6. By contrast, the Mohs hardness of the abrasive is desirably greater than 8, preferably greater than or equal to 9. The maximum Mohs hardness is the 10 of diamond.

In the same manner as for the ferromagnetic powder that is employed along with the ferromagnetic powder employed in the greatest proportion as set forth above, an average particle size that is greater than that of the ferromagnetic powder is desirable in the additional nonmagnetic powder. That is because it permits a reduction in the base portion friction by means of protrusions formed on the base portion by the additional nonmagnetic powder. From this perspective, the difference between the average particle size of the ferromagnetic powder and the average particle size of the additional nonmagnetic powder employed with it, obtained as "(average particle size of latter)−(average particle size of former)", desirably falls within a range of 10 nm to 80 nm, preferably within a range of 10 nm to 50 nm. When employing two or more kinds of ferromagnetic powder of differing average particle size as the ferromagnetic powder, the ferromagnetic powder that is employed in the greatest proportion is adopted among the two or more kinds of ferromagnetic powder as the ferromagnetic powder that is used to calculate the difference in average particle size with the additional nonmagnetic powder. It is naturally also possible to employ two or more kinds of nonmagnetic powder of differing average particle size as the additional nonmagnetic powder. In that case, it is desirable for the average particle size of at least one of the two or more kinds of nonmagnetic powder to satisfy the above difference, preferable for many of the average particle sizes of the nonmagnetic powders to satisfy this difference, and more preferable for the average particle sizes of all of the additional nonmagnetic powders to satisfy this difference.

From the perspective of controlling the base portion friction, the mixing ratio of the ferromagnetic powder and the above additional nonmagnetic powder (the combined total when employing two or more kinds of additional nonmagnetic powder with differing average particle sizes) based on weight desirably falls within a range of former: latter=90.0:10.0 to 99.9:0.1, preferably within a range of 95.0:5.0 to 99.5:0.5.

<Nonmagnetic Layer>

The nonmagnetic layer will be described next. In the above magnetic tape, a nonmagnetic layer containing nonmagnetic powder and binder is present between the nonmagnetic support and the magnetic layer. The nonmagnetic powder that is employed in the nonmagnetic layer can be an organic or an inorganic substance. Carbon black or the like can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content of nonmagnetic powder in the nonmagnetic layer desirably falls within a range of 50 to 90 weight percent, preferably within a range of 60 to 90 weight percent.

Known techniques relating to binders, additives and the like of the nonmagnetic layer can be applied to the nonmagnetic layer. In addition, for example, known techniques relating to magnetic layers can be applied as regards the quantity and type of binder and the quantities and types of additives.

The nonmagnetic layer of the above magnetic tape may be in the form of an essentially nonmagnetic layer containing small quantities of ferromagnetic powder, either in the form of impurities or by intention, for example, along with nonmagnetic powder. The term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Various Thicknesses>

From the perspective of reducing the thickness of the magnetic tape, the combined thickness of the magnetic layer and nonmagnetic layer in the above magnetic tape is less than or equal to 0.60 µm, desirably less than or equal to 0.50 µm. The combined thickness of the magnetic layer and nonmagnetic layer is, for example, greater than or equal to 0.10 µm, and can be greater than or equal to 0.20 µm.

The thickness of the nonmagnetic support in the above magnetic tape is desirably 3.00 µm to 4.50 µm.

The thickness of the magnetic layer can be optimized based on the saturation magnetization level and head gap length of the magnetic head employed, and the bandwidth of the recording signal. Generally, it can be from 0.01 µm to 0.15 µm. From the perspective of achieving higher density recording, it is desirably 0.02 µm to 0.12 µm, preferably from 0.03 µm to 0.10 µm. A single magnetic layer is sufficient, and the magnetic layer can be divided into two or more layers having different magnetic characteristics. Known configurations of multilayer magnetic layers can be applied.

The thickness of the nonmagnetic layer is, for example, 0.10 µm to 0.55 µm, and desirably 0.10 µm to 0.50 µm.

From the perspective of increasing the recording capacity per magnetic tape cartridge, the total thickness of the magnetic tape is desirably less than or equal to 6.00 µm, preferably less than or equal to 5.70 µm, and more preferably, less than or equal to 5.50 µm. From the perspective of ease of handling (the handling property of) the magnetic tape, the overall thickness of the magnetic tape is desirably greater than or equal to 1.00 µm.

<Backcoat Layer>

In the above magnetic tape, a backcoat layer can be present on the opposite surface of the nonmagnetic support from the surface on which the magnetic layer is present. The backcoat layer is a layer containing nonmagnetic powder and binder, can contain carbon black and/or inorganic powder, and can desirably contain carbon black and inorganic powder. The formulas of the magnetic layer and nonmagnetic layer can be applied to the binder and various additives for forming the backcoat layer. The thickness of the backcoat layer is desirably less than or equal to 0.90 μm, preferably 0.10 μm to 0.70 μm.

The thickness of the various layers in the magnetic tape and the nonmagnetic support can be determined by known film thickness measuring methods. For example, a cross-section in the direction of thickness of the magnetic tape is exposed by a known technique such as with an ion beam or microtome, and the exposed cross-section is observed with a scanning electron microscope. The thickness determined at one spot in the direction of thickness by observing the cross-section can be adopted, or the thickness at two or more spots that have been randomly exposed—for example, two spots—can be determined and the arithmetic average thereof adopted. The thickness of each of the various layers can also be determined as a design thickness calculated from manufacturing conditions.

<Manufacturing Process>

The coating compositions (coating liquids) for forming the magnetic layer, nonmagnetic layer, and backcoat layer normally contain solvent in addition to the various components set forth above. The various organic solvents that are commonly employed to manufacture particulate magnetic tapes can be employed as the solvent. The process of preparing the coating composition for forming each layer normally contains at least a kneading step, dispersing step, and mixing steps provided as needed before and after these steps. The various steps can each be divided into two or more steps. All of the starting materials employed in an aspect of the present invention, such as ferromagnetic powder, nonmagnetic powder, fatty acid, fatty acid amide, binder, various abrasives that can be optionally added, and solvent, can be added either initially during the step or part way through. Any individual starting material can be divided for addition in two or more steps. A device with powerful kneading strength such as an open kneader, continuous kneader, pressure kneader, or extruder is desirably employed in the kneading step. Details regarding the kneading processing are described in Japanese Unexamined Patent Publication (KOKAI) Heisei Nos. 1-106338 and 1-79274, which are expressly incorporated herein by reference in their entirety. Further, glass beads and other beads can be employed to disperse the coating compositions for forming the various layers. Dispersion beads with high specific gravities such as zirconia beads, titania beads, and steel beads are suitably employed as such dispersion beads. The particle diameter and fill rate of the dispersion beads can be optimized for use. A known dispersing apparatus can be employed.

In one embodiment, in controlling the base portion friction as set forth above, two or more ferromagnetic powders of differing average particle size can be employed to manufacture the magnetic tape. That is, the magnetic layer can be formed using ferromagnetic powders in the form of a first ferromagnetic powder and one or more ferromagnetic powders of greater average particle size than the first ferromagnetic powder. The following embodiments are examples of forms of desirable methods of forming such a magnetic layer. Two or more of the embodiments given below can be combined as a preferred embodiment of the above manufacturing method. The "first ferromagnetic powder" refers to one of the ferromagnetic powder among the two or more kinds of ferromagnetic powder employed, and desirably refers to the ferromagnetic powder that is employed in the greatest proportion as set forth above. Other details regarding the method of forming the magnetic layer are as set forth above.

- The average particle size of the first ferromagnetic powder can fall within a range of 10 nm to 80 nm.
- The difference between the average particle size of the ferromagnetic powder with an average particle size greater than that of the first ferromagnetic powder and the average particle size of the first ferromagnetic powder can fall within a range of 10 nm to 50 nm.
- The mixing ratio of the first ferromagnetic powder to the ferromagnetic powder with an average particle size greater than that of the first ferromagnetic powder, by weight, can fall within a range of former:latter=90.0:10.0 to 99.9:0.1.

In another embodiment, the magnetic tape can be manufactured using additional nonmagnetic powder in addition to the abrasive and protrusion-forming agent as nonmagnetic powders in the magnetic layer. That is, the magnetic layer can be formed using additional nonmagnetic powder along with the abrasive and protrusion-forming agent as the nonmagnetic powder. The following embodiments are examples of a desirable embodiment of the method of forming such a magnetic layer. A combination of two or more of the following embodiments is a preferred embodiment of the above manufacturing method. Other details regarding the method of forming the magnetic layer are as set forth above.

- The average particle size of the additional nonmagnetic powder can be greater than the average particle size of the ferromagnetic powder.
- The difference between the average particle size of the ferromagnetic powder and the average particle size of the additional nonmagnetic powder can fall within a range of 10 nm to 80 nm.
- The mixing ratio of the ferromagnetic powder and the additional nonmagnetic powder, based on weight, can fall within a range of former:latter=90.0:10.0 to 99.9:0.1.

(Coating Step, Cooling Step, Heating and Drying Step)

The magnetic layer can be formed by sequentially or simultaneously multilayer coating the magnetic layer forming composition and the nonmagnetic layer forming composition. Reference can be made to Japanese Unexamined Patent Publication (KOKAI) No. 2010-231843, paragraph 0066, for details regarding coatings for forming the various layers. The content of the above publication is expressly incorporated herein by reference in its entirety.

In one desirable embodiment, the magnetic tape of an aspect of the present invention can be manufactured by sequential multilayer coating. The manufacturing steps in sequential multilayer coating are desirably conducted as follows. The nonmagnetic layer is formed by a coating step of forming a coating layer of the nonmagnetic layer forming composition on the nonmagnetic support by coating; and a heating and drying step of drying by a heat treatment the coating layer that has been formed. The magnetic layer forming composition is then coated on the nonmagnetic layer that has been formed in a coating step to form a coating layer, followed by a heating and drying step of drying by a heat treatment the coating layer that has been formed to form the magnetic layer.

In the manufacturing method by sequential multilayer coating, the nonmagnetic layer forming step can be conducted using a nonmagnetic layer forming composition containing one or more components selected from the group consisting of a fatty acid and a fatty acid amide in the coating step. Between the coating step and the heating and drying step, it is desirable to conduct a cooling step of cooling the coating layer to adjust the outer layer portion C—H derived C concentration to greater than or equal to 45 atom % in a magnetic tape containing one or more components selected from the group consisting of a fatty acid and a fatty acid amide in at least the magnetic layer. Although the reasons for this are unclear, the present inventor assumes that cooling the coating layer of the nonmagnetic layer forming composition prior to the heating and drying step might facilitate migration of the above component (fatty acid, fatty acid amide) onto the nonmagnetic layer surface during solvent volatization in the heating and drying step. However, this is merely conjecture, and does not limit the present invention in any way.

That is, an aspect of the present invention relates to a method of manufacturing the above magnetic tape, which includes a step of forming a nonmagnetic layer and a step of forming a magnetic layer, wherein the step of forming the nonmagnetic layer includes:

a coating step of forming a coating layer by coating on a nonmagnetic support a nonmagnetic layer forming composition comprising one or more components selected from the group consisting of a fatty acid and a fatty acid amide, nonmagnetic powder, binder, and solvent;

a heating and drying step of drying the coating layer by a heat treatment; and the step of forming the nonmagnetic layer further includes, between the coating step and the heating and drying step, a cooling step of cooling the coating layer.

In the step of forming the magnetic layer, a coating step of forming a coating layer by coating on a nonmagnetic layer a magnetic layer forming composition containing ferromagnetic powder, binder, and solvent can be conducted, and a heating and drying step of drying by a heat treatment the coating layer that has been formed can be conducted. The magnetic tape of an aspect of the present invention contains in at least the magnetic layer one or more components selected from the group consisting of a fatty acid and a fatty acid amide. It is desirable for the magnetic layer forming composition to contain one or more components selected from the group consisting of a fatty acid and a fatty acid amide to manufacture the magnetic tape. However, it is not essential that one or more components selected from the group consisting of a fatty acid and a fatty acid amide be contained in the magnetic layer forming composition. That is because it is conceivable to form a magnetic layer containing one or more components selected from the group consisting of a fatty acid and a fatty acid amide by forming a magnetic layer by coating a magnetic layer forming composition on a nonmagnetic layer after the component contained in the nonmagnetic layer forming composition has migrated to the surface of the nonmagnetic layer.

A specific embodiment of the manufacturing method will be described below based on FIG. 1. However, the present invention is not limited to the specific embodiment given below.

FIG. 1 is a schematic process diagram showing a specific embodiment of the steps of manufacturing a magnetic tape having a backcoat layer on the other surface of a nonmagnetic support from that on which are sequentially present a nonmagnetic layer and a magnetic layer. In the embodiment shown in FIG. 1, a nonmagnetic support (long film) is continuously subjected to an operation of being fed by a feeding part and being wound up in a winding part. In various parts or various zones shown in FIG. 1, various processes such as coating, drying, and orienting can be conducted to form by sequential multilayer coating a nonmagnetic layer and a magnetic layer on one surface of a nonmagnetic support that is running, and a backcoat layer can be formed on the other surface. With the exception of comprising a cooling zone, the manufacturing process can be identical to the one that is commonly conducted to manufacture a particulate magnetic recording medium.

In a first coating part, the nonmagnetic layer forming composition is coated on the nonmagnetic support that has been fed from the feeding part (step of coating the nonmagnetic layer coating composition).

After the above coating step, the coating layer of the nonmagnetic layer forming composition that has been formed in the coating step is cooled in a cooling zone (cooling step). For example, the cooling step can be conducted by having the nonmagnetic support on which the coating layer has been formed pass through a cooling atmosphere. The temperature of the cooling atmosphere desirably falls within a range of $-10°$ C. to $0°$ C., preferably within a range of $-5°$ C. to $0°$ C. The duration of the cooling step (for example, the time from when some portion of the coating layer is conveyed into the cooling zone to when it is conveyed out, also referred to as the "residence time" hereinafter) is not specifically limited. However, the longer it is, the higher the C—H derived C concentration tends to be. Thus, it is desirable adjusted, for example, based on preliminary testing based on the necessity of achieving a C—H derived C concentration of greater than or equal to 45 atom %. In the cooling step, a cooled gas can be blown onto the surface of the coating layer.

After the cooling zone, in the first heat treatment zone, the coating layer following the cooling step is dried by being heated (heating and drying step). The heating and drying step can be conducted by causing the nonmagnetic support on which the coating layer is present following the cooling step to pass through a heating atmosphere. Here, the temperature of the heating atmosphere is, for example, about $60°$ C. to $140°$ C. However, any temperature that will dry the coating layer by evaporating the solvent will do, and there is no limit to the above range. A heated gas can be optionally blown onto the surface of the coating layer. The same holds true for the heating and drying step in the second heat treatment zone and the heating and drying step in the third heat treatment zone, described further below.

In the second coating part, the magnetic layer forming composition is coated on the nonmagnetic layer that has been formed by the heating and drying step in the first heat treatment zone (magnetic layer forming composition coating step).

Subsequently, while the coating layer of the magnetic layer forming composition is still wet, a step of orienting the ferromagnetic powder in the coating layer is conducted in an orienting zone. Reference can be made to Japanese Unexamined Patent Publication (KOKAI) No. 2010-231843, paragraph 0067, with regard to orientation processing.

The coating layer following the orientation processing is subjected to a heating and drying step in a second heat treatment zone.

Then, in a third coating part, a backcoat layer forming composition is coated to the surface on the opposite side of the nonmagnetic support from the surface on which the nonmagnetic layer and magnetic layer have been formed to form a coating layer (the backcoat layer forming composition coating step). Subsequently, the coating layer is heat treated and dried in a third heat treatment zone.

A magnetic tape can be obtained with a nonmagnetic layer and magnetic layer present in that order on one surface of a nonmagnetic support, and a backcoat layer present on the other surface. The magnetic tape obtained can be wound up on the winding part and then optionally subjected to various post-processing (various surface processing such as calendering). Known post-processing techniques in the manufacturing of particulate magnetic recording media can be applied without restriction. For example, reference can be made to Japanese Unexamined Patent Publication (KOKAI) No. 2010-231843, paragraph 0069, for a cutting step that is normally conducted after various post-processing.

Magnetic Tape Cartridge and Magnetic Recording and Reproducing Device

A further aspect of the present invention relates to a magnetic tape cartridge housing the above magnetic tape.

A still further aspect of the present invention relates to a magnetic recording and reproducing device containing the above magnetic tape cartridge and magnetic head.

In a magnetic tape cartridge, the magnetic tape is generally housed in a wound-up state on one or two reels within the cartridge main body. The reels are disposed in a manner permitting rotation within the main body of the cartridge. Magnetic tape cartridges in the form of single-reel type magnetic tape cartridges equipped with a single reel within the cartridge main body and dual-reel type magnetic tape cartridges equipped with two reels within the cartridge main body are widely employed. When a single-reel magnetic tape cartridge is loaded into a magnetic recording and reproducing device (drive) to record and/or reproduce a magnetic signal on the magnetic tape, the magnetic tape is drawn out of the magnetic tape cartridge and taken up on a reel on the drive side. A magnetic head is disposed on the tape conveyance route from the magnetic tape cartridge to the take-up reel. Magnetic tape feeding and winding take place between the reel (feed reel) on the magnetic tape cartridge side and the reel (tape-up reel) on the drive side. In this space, the magnetic head and the surface of the magnetic layer of the magnetic tape come into contact (slide against each other) to conduct magnetic signal recording and reproduction. By contrast, in a dual-reel magnetic tape cartridge, the two reels of the feed reel and the take-up reel are provided within the magnetic tape cartridge. The magnetic tape cartridge of an aspect of the present invention can be of either the single-reel type or dual-reel type magnetic tape cartridge. The configuration of the magnetic tape cartridge is known. In the magnetic tape cartridge according to an aspect of the present invention, known configurations can be applied without limitation. For example, the magnetic tape cartridge according to an aspect of the present invention can be a linear-tape-open (LTO) format magnetic tape cartridge. Further, the magnetic tape cartridge according to an aspect of the present invention can be a magnetic tape cartridge of other than LTO format.

The greater the total length of the magnetic tape housed in each magnetic tape cartridge is made, the greater the recording capacity per cartridge becomes. From this perspective, the total length of the magnetic tape housed in the above magnetic tape cartridge is desirably greater than or equal to 10 m. For example, 10 m to about 1,500 m is desirable. However, the greater the total length of the tape becomes, the longer the time required to record and reproduce at a given conveyance speed. Thus, increasing the conveyance speed is desirable to shorten the recording and reproduction time in cases where the total length of the tape has been increased to enhance the recording capacity. Increasing the conveyance speed is desirable to shorten the recording and reproduction time, regardless of the total length of the tape. Additionally, in a thin magnetic tape in which the combined thickness of the nonmagnetic layer and magnetic layer is less than or equal to 0.60 µm, the phenomenon of a drop in the electromagnetic characteristics with repeated high-speed conveyance was observed. By contrast, in the magnetic tape according to one aspect of the present invention, the combined thickness of the nonmagnetic layer and the magnetic layer is less than or equal to 0.60 µm, but good electromagnetic characteristics can be achieved even with repeated high-speed conveyance by keeping the base portion friction and the outer layer portion C—H derived C concentration to within the ranges set forth above. Accordingly, the magnetic tape according to one aspect of the present invention is suitable as a magnetic tape for magnetic tape cartridges in which the total length of the tape has been increased to enhance the recording capacity and as a magnetic recording and reproducing device in which the conveyance speed has been raised to shorten the recording and reproduction time. As the relative speed of the magnetic head and the magnetic tape during recording and/or reproduction of a magnetic signal, the conveyance speed is desirably greater than or equal to 7 m/sec., preferably greater than or equal to 8 m/sec., and can be, for example, about 8 to 15 m/sec.

Various magnetic heads known as a recording head and/or reproduction head, such as a magnetoresistive (MR), can be employed as the magnetic heads of the magnetic recording and reproducing device according to one aspect of the present invention. Configurations of magnetic recording and reproducing devices are known. A known configuration can be applied without limitation to the configuration of the magnetic recording and reproducing device according to an aspect of the present invention.

EXAMPLES

The present invention will be described in greater detail below through Examples. However, the present invention is not limited to the embodiments shown in Examples. The "parts" and "percent (%)" indicated below denote "weight parts" and "weight percent (%)", unless otherwise stated.

Examples 1 to 8, Comparative Examples 1 to 10

1. Preparation of an Alumina Dispersion

To 100.0 parts of alumina powder (HIT-70 made by Sumitomo Chemical Co., Ltd.) with an approximately 65% alpha conversion rate and a BET specific surface area of 30 m$^2$/g were admixed 3.0 parts of 2,3-dihydroxynaphthalene (made by Tokyo Chemical Industry Co., Ltd.), 31.3 parts of a 32% solution (solvent: a mixed solvent of methyl ethyl ketone and toluene) of polyester polyurethane resin (UR-4800 (polar group content: 80 meq/kg) made by Toyobo (Japanese registered trademark)) containing polar groups in the form of SO$_3$Na groups, and 570.0 parts of solvent in the form of a 1:1 (by weight) mixed solvent of methyl ethyl ketone and cyclohexanone and the mixture was dispersed for 5 hours in a paint shaker in the presence of zirconia beads. Following dispersion, the dispersion liquid and beads were separated with a mesh, yielding an alumina dispersion.

2. Formula of the Magnetic Layer Forming Composition

| (Magnetic liquid) | |
| --- | --- |
| Ferromagnetic powder (1) (see Table 5) | See Table 5 |
| Ferromagnetic powder (2) (see Table 5) | See Table 5 |
| SO$_3$Na group-containing polyurethane resin (weight average molecular weight: 70,000, SO$_3$Na groups: 0.2 meq/g) | 14.0 parts |
| Cyclohexanone | 150.0 parts |
| Methyl ethyl ketone | 150.0 parts |

| (Abrasive liquid) | |
| --- | --- |
| Alumina dispersion prepared in 1. above | 6.0 parts |
| (Silica sol) | |
| Colloidal silica (silica colloid particles satisfying the above definition) | 2.0 parts |
| Average particle size: 100 nm | |
| Methyl ethyl ketone | 1.4 parts |

| (Other components) | |
| --- | --- |
| Stearic acid | See Table 5 |
| Amide stearate | See Table 5 |
| Butyl stearate | See Table 5 |
| Polyisocyanate (Coronate (Japanese registered trademark) L made by Nippon Polyurethane Industry Co., Ltd.) | 2.5 parts |

| (Solvents added to finish) | |
| --- | --- |
| Cyclohexanone | 200.0 parts |
| Methyl ethyl ketone | 200.0 parts |

3. Formula of Nonmagnetic Layer Forming Composition

| | |
| --- | --- |
| Nonmagnetic inorganic powder: α-iron oxide | 100.0 parts |
| Average particle size (average major axis length): 10 nm | |
| Average acicular ratio: 1.9 | |
| BET specific surface area: 75 m²/g | |
| Carbon black | 20.0 parts |
| Average particle size: 20 nm | |
| SO$_3$Na group-containing polyurethane resin | 18.0 parts |
| (weight average molecular weight: 70,000, SO$_3$Na groups: 0.2 meq/g) | |
| Stearic acid | See Table 5 |
| Amide stearate | See Table 5 |
| Butyl stearate | See Table 5 |
| Cyclohexanone | 300.0 parts |
| Methyl ethyl ketone | 300.0 parts |

4. Formula of Backcoat Layer Forming Composition

| | |
| --- | --- |
| Nonmagnetic inorganic powder: α-iron oxide | 80.0 parts |
| Average particle size (average major axis length): 0.15 μm | |
| Average acicular ratio: 7 | |
| BET specific surface area: 52 m²/g | |
| Carbon black | 20.0 parts |
| Average particle size: 20 nm | |
| Vinyl chloride copolymer | 13.0 parts |
| Sulfonic acid salt group-containing polyurethane resin | 6.0 parts |
| Phenylphosphonic acid | 3.0 parts |
| Cyclohexanone | 155.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 200.0 parts |

5. Preparation of Various Layer-Forming Compositions

A magnetic layer forming composition was prepared by the following method. The above magnetic liquid was prepared by dispersing (bead dispersing) the various components for 24 hours in a batch-type vertical sand mill. Zirconia beads 0.5 mmΦ in bead diameter were employed as dispersing beads. Using the above sand mill, the magnetic liquid that had been prepared and the above abrasive liquid were mixed with the other components (silica sol, other components, and solvents added to finish) and bead dispersed for 5 minutes, after which 0.5 min of processing (ultrasonic dispersion) was conducted in a batch-type ultrasonic device (20 kHz, 300 W). Subsequently, filtering was conducted with a filter having an average pore diameter of 0.5 μm to prepare a magnetic layer forming composition.

A nonmagnetic layer forming composition was prepared by the following method. With the exception of the lubricants (stearic acid, amide stearate, and butyl stearate), cyclohexane, and methyl ethyl ketone, the various components were dispersed for 24 hours in a batch-type vertical sand mill to obtain a dispersion. Zirconia beads 0.1 mmΦ in bead diameter were employed as dispersing beads. Subsequently, the remaining components were added to the dispersion that had been obtained and the mixture was stirred in a dissolver. The dispersion thus obtained was filtered with a filter having an average pore diameter of 0.5 μm to prepare a nonmagnetic layer forming composition.

A backcoat layer forming composition was prepared by the following method. With the exception of the lubricants (stearic acid and butyl stearate), the polyisocyanate, and the cyclohexanone, the various components were kneaded and diluted in an open kneader. A horizontal bead mill disperser was then used to conduct 12 passes of dispersion processing, each pass containing a retention time of 2 minutes, at a rotor tip peripheral speed of 10 m/sec. and at a bead fill rate of 80 volume % employing zirconia beads 1 mmΦ in bead diameter. Subsequently, the remaining components were added to the dispersion obtained and the mixture was stirred in a dissolver. The dispersion liquid thus obtained was filtered with a filter having an average pore diameter of 1 μm to prepare a backcoat layer-forming composition.

6. Fabrication of Magnetic Tapes

Magnetic tapes were fabricated based on the specific embodiment shown in FIG. 1. The details are set forth below.

A polyethylene naphthalate support of the thickness given in Table 5 was fed out by a feeding part. In a first coating part, the nonmagnetic layer forming composition prepared in 5. above was coated on one surface thereof in a quantity calculated to yield the thickness shown in FIG. 5 upon drying, forming a coating layer. While the coating layer that had been formed was still wet, it was passed through a cooling zone that had been adjusted to an atmospheric temperature of 0° C. for the residence time given in Table 5 to conduct a cooling step. Subsequently, it was passed through a first heat treatment zone with an atmospheric temperature of 100° C. to conduct a heating and drying step, forming a nonmagnetic layer.

Subsequently, in a second coating part, the magnetic layer forming composition that had been prepared in 5. above was coated over the nonmagnetic layer in a quantity calculated to yield the thickness shown in FIG. 5 upon drying, forming a coating layer. While the coating layer was still wet (had yet to dry), a magnetic field with a magnetic field strength of 0.3 T was applied vertically with respect to the surface of the coating layer of the magnetic layer forming composition to conduct a vertical orientation treatment in an orienting zone. Subsequently, drying was conducted in a second heat treatment zone (atmospheric temperature: 100° C.).

Subsequently, in a third coating part, the backcoat layer forming composition that had been prepared in 5. above was coated on the opposite surface of the polyethylene naphthalate nonmagnetic support from that on which the nonmagnetic layer and magnetic layer had been formed in a quantity calculated to give the thickness shown in FIG. 5 upon drying to form a coating layer. The coating layer that had been formed was dried in a third heat treatment zone (atmospheric temperature: 100° C.).

Subsequently, a calender treatment (surface smoothing treatment) was conducted at a temperature (calender roll surface temperature) of 100° C., a linear pressure of 300 kg/cm, and a speed of 80 m/min with calender rolls comprised solely of metal rolls, followed by a heat treatment for 36 hours in an environment with an atmospheric temperature of 70° C. The product was then slit to ½ inch (0.0127 meter) width to obtain a magnetic tape.

In FIG. 5, in the comparative examples in which "0 sec." is recorded in the column of the cooling zone residence time, a magnetic tape was fabricated by a manufacturing process that did not include a cooling zone.

The thickness of the various layers of the magnetic tapes that had been fabricated and the nonmagnetic support, as well as the total thickness, were determined by the following method. The thicknesses of the various layers that had been formed were confirmed to be the thicknesses given in Table 5.

A cross-section of the magnetic tape in the direction of thickness was exposed with an ion beam. The exposed cross-section was then observed with a scanning electron microscope. The various thicknesses were determined as the arithmetic average of the thicknesses in two spots in the direction of thickness by cross-sectional observation.

[Evaluation Methods]
1. Outer Layer Portion C—H Derived C Concentration

X-ray photoelectron spectroscopy was conducted with an ESCA device on the magnetic layer surface (measurement region: 300 μm×700 μm) of the magnetic tapes of Examples and Comparative Examples by the following method. The outer layer portion C—H derived C concentration was calculated from the analysis results. The calculated values are given in Table 5.

(Analytic and Calculation Methods)

The measurements of (1) to (3) below were all conducted under the conditions shown in Table 1.

TABLE 1

| Device | AXIS-ULTRA made by Shimadzu Corp. |
|---|---|
| Excitation X-ray source | Monochromatized Al-Kα radiation (output: 15 kV, 20 mA) |
| Analyzer mode | Spectrum |
| Lens mode | Hybrid (analysis area: 300 μm × 700 μm) |
| Neutralizing electron gun for charge compensation (charge neutralizer) | On (used) |
| Photoelectron take-off angle | 10 deg. (angle of device relative to sample surface) |

(1) Wide Scan Measurement

The types of elements detected by wide scan measurement (measurement conditions: see Table 2) by ESCA on the magnetic layer surface of the magnetic tape were examined (qualitative analysis).

TABLE 2

| Scan range | Pass energy | Energy resolution (step) | Pickup time (Dwell) | Cumulative number (Sweeps) |
|---|---|---|---|---|
| 0 to 1200 cV | 160 cV | 1 eV/step | 100 ms/step | 5 |

(2) Narrow Scan Measurement

Narrow scan measurement (measurement conditions: see Table 3) was conducted for each of the elements detected in (1) above. The auxiliary data processing software of the device (Vision 2.2.6) was employed to calculate the atomic concentration (unit: atom %) of each element detected in the peak areas of the various elements. The C concentration was also calculated from the peak area of the C1s spectrum.

TABLE 3

| Spectrum[Note 1)] | Scan range | Pass energy | Energy resolution (Step) | Pickup time (Dwell) | Cumulative number (Sweeps)[Note 2)] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

Note 1)The spectrum (type pf element) shown in Table 3 is an example. When an element that is not shown in Table 3 was detected in the qualitative analysis of (1), identical narrow scan measurements were conducted over a scan range containing all of the spectra of elements detected.

Note 2)For spectra with good signal-to-noise (S/N) ratios, measurements were taken a total of three times. However, the quantitative results were not affected for any of the spectra when measurements were taken a total of five times.

(3) Obtaining the C1s Spectrum

C1s spectra were obtained under the measurement conditions given in Table 4. The auxiliary data processing software (Vision 2.2.6) of the device was used to compensate for the shift (physical shift) due to the sample charge in the C1s spectrum obtained. The same software was then used to conduct fitting (peak separation) of the C1s spectrum. In peak separation, a Gauss-Lorentz complex function (Gauss component 70%, Lorentz component 30%) was employed, fitting of the C1s spectrum was conducted by the nonlinear least squares method, and the proportion of the C—H peak accounted for by the C1s spectrum (peak area ratio) was calculated. The calculated C—H peak area ratio was multiplied by the C concentration obtained in (2) above to calculate the C—H derived C concentration.

TABLE 4

| Spectrum | Scan range | Pass energy | Energy resolution (Step) | Pickup time (Dwell) | Cumulative number (Sweeps) |
|---|---|---|---|---|---|
| C1s | 276 to 296 eV | 10 eV | 0.1 eV/step | 200 ms/step | 20 |

The arithmetic average of values obtained by conducting the above processing three times at different positions on the surface of the magnetic layer was adopted as the outer layer portion C—H derived C concentration. The values calculated are given in Table 5.

2. Determining the Contribution of Fatty Acid and Fatty Acid Amide to the Outer Layer Portion C—H Derived C Concentration (1) Two magnetic tapes (sample tapes) were fabricated by the same method as in Example 1. One of the sample tapes was measured with the above ESCA device, and the other was solvent extracted (solvent: methanol) in an unmeasured state.

Gas chromatography analysis of the quantities of the fatty acid, fatty acid amide, and fatty acid ester in the solutions obtained by extraction revealed almost no differences in the quantitative values of the two sample tapes for the fatty acid (stearic acid) and fatty acid amide (amide stearate). However, the quantitative value of the fatty acid ester (butyl stearate) in the sample tape following measurement was markedly lower than in the unmeasured sample tape. This was attributed to the fatty acid ester having volatized in the vacuum chamber in which the sample being measured was placed during measurement in the ESCA device.

Based on the above results, the fatty acid ester was determined not to have affected the outer layer portion C—H derived C concentration obtained by analysis by ESCA.

(2) Components contained in the magnetic layer forming composition and components that are contained in the nonmagnetic layer forming composition and may migrate from the nonmagnetic layer to the magnetic layer in a magnetic tape and can thus be present in the magnetic layer are organic compounds excluding solvents and polyisocyanate (being crosslinked by any of treatments with heating) in the form of stearic acid, amide stearate, butyl stearate, 2,3-dihydroxynaphthalene, and polyurethane resin. Of these components, butyl stearate, as stated above, has been determined not to affect the outer layer portion C—H derived C concentration based on the results of (1) above.

The effects of 2,3-dihydroxynaphthalene and polyurethane resin on the outer layer portion C—H derived C concentration were determined next by the following method.

For the 2,3-dihydroxynaphthalene and polyurethane resin employed in Example 1, a C1s spectrum was obtained by the same method as above. The peak positioned in the vicinity of a bond energy of 286 eV and the C—H peak were separated by the processing set forth above for the peaks obtained. The proportion accounted for by the various separated peaks in the C1s spectrum (peak area ratios) were calculated, and the ratio of the area of the peak in the vicinity of a bond energy of 286 eV to the C—H peak was calculated.

Next, in the C1s spectrum obtained in Example 1, the peaks positioned in the vicinity of a bond energy of 286 eV were separated by the processing set forth above. While 2,3-dihydroxynaphthalene and polyurethane resin have peaks in the vicinity of a bond energy of 286 eV in the C1s spectrum, fatty acid (stearic acid) and fatty acid amide (amide stearate) do not. Accordingly, the peaks positioned in the vicinity of a bond energy of 286 eV in the C1s spectrum obtained in Example 1 were determined to have been derived from 2,3-dihydroxynapththalene and polyurethane resin. Accordingly, using these peaks, based on the ratio of the peak areas calculated above, the contribution of 2,3-dihydroxynaphthalene and polyurethane resin to the C—H peak of the C1s spectrum obtained in Example 1 was calculated to be only about 10%. Based on these results, the greater part (about 90%) of the C—H peak in the C1s spectrum obtained in Example 1 was determined to have been derived from fatty acid (stearic acid) and fatty acid amide (amide stearate).

Based on these results, the outer layer portion C—H derived C concentration was demonstrated to be an indicator of the quantity of fatty acid and fatty acid amide present.

3. Base Portion Friction

Scribe marks were made in advance with a laser marker on the measurement surface and an atomic force microscope (AFM) image was measured in a portion at a certain distance (about 100 μm) from them. This was done at a viewing area 7 μm square. As set forth further below, to facilitate the pickup up of a scanning electron microscope (SEM) image at the spot, a hard (single crystal silicon) cantilever was installed and scribe marks were made on the AFM. All protrusions with a height of greater than or equal to 15 nm above the reference plane were extracted from the AFM image thus measured. The spot where no protrusions were found was specified as the base portion. The base portion friction was measured by the method described above using a TI-950 Triboindenter made by Hysitron Corp.

A SEM image was measured at the same spot where the AFM had been measured and a component map was obtained. The protrusions greater than or equal to 15 nm in height above the reference plane that were extracted were determined to be protrusions formed of alumina or colloidal silica. In Examples 1 to 8, in the component map by SEM, alumina and colloidal silica were not confirmed on the base portion. Component analysis was performed there by SEM. However, component analysis is not limited to SEM, and can be conducted by known methods such as energy dispersive X-ray spectrometry (EDS), auger electron spectroscopy (AES), or the like.

The results are given in Table 5.

4. Calculating the Drop in the Signal-to-Noise (S/N) Ratio Due to Repeated High-Speed Conveyance Recording and reproduction were conducted before and after running by the method set forth below using a ½ inch (0.0127 meter) reel tester on which heads had been secured, and the electromagnetic characteristics (S/N ratio) was measured.

The electromagnetic characteristics were measured by the following method. A conveyance speed (relative head/tape speed) of 5.5 m/sec. was adopted. Recording was conducted with a metal-in-gap (MIG) head (gap length: 0.15 μm, track width: 1.0 μm). The recording current was set to the optimal recording current of each tape. A giant magnetoresistive (GMR) head with an element thickness of 15 nm, a shield gap of 0.1 μm, and a read width of 0.5 μm was employed as the reproduction head. A signal was recorded at a linear recording density of 270 KFci. The reproduced signal was measured with a spectrum analyzer made by Shibasoku. The ratio of the carrier signal output to the integrated noise of the entire spectral bandwidth was adopted as the S/N ratio. The portion of the signal that had adequately stabilized following the start of magnetic tape running was employed.

Running was conducted as 5,000 back and forth passes of 1,000 m per pass of the magnetic tape at a conveyance speed (head/gap relative speed) of 12.0 m/sec. using the above reel tester.

Before and after running, the electromagnetic characteristics were measured by the above method, S/N ratio was calculated, and the difference of "(S/N ratio before running)−(S/N ratio after running)" was adopted as the drop in S/N ratio due to repeated running and high-speed conveyance (conveyance speed: 12.0 m/sec). These are given in Table 5. A drop in the S/N ratio of less than or equal to 2.0 dB was judged to indicate a magnetic tape capable of achieving good electromagnetic characteristics with little drop in the electromagnetic characteristics even with repeated high-speed conveyance.

The details of the magnetic tapes of Examples and Comparative Examples, along with the results of the above evaluation, are given in Table 5. In Table 5, BF denotes ferromagnetic hexagonal barium ferrite powder and MP denotes ferromagnetic metal powder. The formula ratios of ferromagnetic powders (1) and (2) are the contents based on weight of the various ferromagnetic powders per 100.0 weight parts of the total weight of ferromagnetic powder. In Table 5, the average particle size of the ferromagnetic powder is the average plate diameter for the ferromagnetic hexagonal barium ferrite powder and the average major axis length for the ferromagnetic metal powder. The average particle size of a ferromagnetic powder is a value determined by collecting a necessary quantity from a ferromagnetic powder lot employed in the fabrication of the magnetic tapes and calculating the average particle size by the method set forth above. Following measurement, the ferromagnetic powder was used to prepare the magnetic liquid for fabricating a magnetic tape.

TABLE 5

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Ferromagnetic particle (1) | Type | BF | MP | BF | BF | BF | BF | BF | BF |
| | Average particle diameter | 25 nm | 32 nm | 25 nm | 25 nm | 25 nm | 25 nm | 25 nm | 25 nm |
| | Formula ratio | 99.0% | 99.0% | 98.5% | 98.5% | 99.2% | 99.0% | 98.5% | 99.0% |
| Ferromagnetic particle (2) | Type | BF | MP | BF | BF | BF | BF | BF | BF |
| | Average particle diameter | 55 nm | 60 nm | 55 nm | 55 nm | 55 nm | 55 nm | 55 nm | 55 nm |
| | Formula ratio | 1.0% | 1.0% | 1.5% | 1.5% | 0.8% | 1.0% | 1.5% | 1.0% |
| Magnetic layer thickness | | 0.10 μm | 0.10 μm | 0.10 μm | 0.10 μm | 0.10 μm | 0.10 μm | 0.10 μm | 0.10 μm |
| Nonmagnetic layer thickness | | 0.50 μm | 0.50 μm | 0.50 μm | 0.50 μm | 0.50 μm | 0.30 μm | 0.30 μm | 0.50 μm |
| Magnetic layer thickness + Nonmagnetic layer thickness | | 0.60 μm | 0.60 μm | 0.60 μm | 0.60 μm | 0.60 μm | 0.40 μm | 0.40 μm | 0.60 μm |
| Nonmagnetic support thickness | | 4.30 μm | 4.30 μm | 4.30 μm | 4.30 μm | 4.30 μm | 4.30 μm | 4.30 μm | 4.30 μm |
| Backcoat layer thickness | | 0.60 μm | 0.60 μm | 0.60 μm | 0.60 μm | 0.60 μm | 0.60 μm | 0.60 μm | 0.60 μm |
| Total thickness of the magnetic tape | | 5.50 μm | 5.50 μm | 5.50 μm | 5.50 μm | 5.50 μm | 5.30 μm | 5.30 μm | 5.50 μm |
| Cooling zone residence time | | 50 sec. | 50 sec. | 50 sec. | 180 sec. | 1 sec. | 50 sec. | 180 sec. | 50 sec. |
| Magnetic layer forming composition | Stearic acid/part | 2.0 | 2.0 | 2.0 | 2.0 | 2.0 | 2.0 | 2.0 | 2.0 |
| | Amide stearate/part | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 |
| Nonmagnetic layer forming composition | Stearic acid/part | 0.2 | 0.2 | 0.2 | 0.2 | 0.2 | 0.2 | 0.2 | 0.2 |
| | Amide stearate/part | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 2.0 | 5.0 |
| Base portion friction | | 0.28 | 0.26 | 0.23 | 0.23 | 0.35 | 0.28 | 0.23 | 0.28 |
| Outer layer portion C—H derived C concentration | | 65 atom % | 65 atom % | 65 atom % | 70 atom % | 45 atom % | 65 atom % | 70 atom % | 65 atom % |
| Drop in S/N ratio | | 0.8 dB | 0.7 dB | 0.5 dB | 0.3 dB | 1.1 dB | 0.9 dB | 0.7 dB | 0.8 dB |

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Ferromagnetic particle (1) | Type | BF | BF | BF | BF | BF | BF | MP | BF | BF | BF |
| | Average particle diameter | 25 nm | 25 nm | 25 nm | 25 nm | 25 nm | 25 nm | 32 nm | 25 nm | 25 nm | 25 nm |
| | formula ratio | 100% | 100% | 100% | 100% | 100% | 99.0% | 99.0% | 100% | 100% | 100% |
| Ferromagnetic particle (2) | Type | — | — | — | — | — | BF | MP | — | — | — |
| | Average particle diameter | — | — | — | — | — | 55 nm | 60 nm | — | — | — |
| | Formula ratio | — | — | — | — | — | 1.0% | 1.0% | — | — | — |
| Magnetic layer thickness | | 0.10 μm | 0.10 μm | 0.10 μm | 0.10 μm | 0.10 μm | 0.10 μm | 0.10 μm | 0.10 μm | 0.10 μm | 0.10 μm |
| Nonmagnetic layer thickness | | 1.00 μm | 0.70 μm | 1.00 μm | 0.50 μm | 0.30 μm | 0.50 μm | 0.50 μm | 0.50 μm | 0.50 μm | 0.50 μm |
| Magnetic layer thickness + Nonmagnetic layer thickness | | 1.10 μm | 0.80 μm | 1.10 μm | 0.60 μm | 0.40 μm | 0.60 μm | 0.60 μm | 0.60 μm | 0.60 μm | 0.60 μm |
| Nonmagnetic support thickness | | 4.30 μm | 4.30 μm | 4.00 μm | 4.30 μm | 4.30 μm | 4.30 μm | 4.30 μm | 4.30 μm | 4.30 μm | 4.30 μm |
| Backcoat layer thickness | | 0.60 μm | 0.30 μm | 0.40 μm | 0.60 μm | 0.60 μm | 0.60 μm | 0.60 μm | 0.60 μm | 0.60 μm | 0.60 μm |
| Total thickness of the magnetic tape | | 6.00 μm | 5.40 μm | 5.50 μm | 5.50 μm | 5.30 μm | 5.50 μm | 5.50 μm | 5.50 μm | 5.50 μm | 5.50 μm |
| Cooling zone residence time | | 0 sec. | 0 sec. | 0 sec. | 0 sec. | 0 sec. | 50 sec. | 0 sec. | 0 sec. | 180 sec. | 0 sec. |

TABLE 5-continued

| | | | | | | | | | | | |
|---|---|---|---|---|---|---|---|---|---|---|---|
| Magnetic layer forming composition | Stearic acid/part | 2.0 | 2.0 | 2.0 | 2.0 | 2.0 | 2.0 | 2.0 | 2.0 | 2.0 | 6.0 |
| | Amide stearate/part | 0.2 | 0.2 | 0.2 | 0.2 | 0.2 | 0.2 | 0.2 | 0.2 | 0.2 | 1.0 |
| | Butyl stearate/part | 2.0 | 2.0 | 2.0 | 2.0 | 2.0 | 2.0 | 2.0 | 2.0 | 2.0 | 2.0 |
| Nonmagnetic layer forming composition | Stearic acid/part | 2.0 | 2.0 | 2.0 | 2.0 | 2.0 | 2.0 | 2.0 | 2.0 | 2.0 | 6.0 |
| | Amide stearate/part | 0.2 | 0.2 | 0.2 | 0.2 | 0.2 | 0.2 | 0.2 | 0.2 | 0.2 | 1.0 |
| | Butyl stearate/part | 2.0 | 2.0 | 2.0 | 2.0 | 2.0 | 2.0 | 2.0 | 2.0 | 2.0 | 2.0 |
| Base portion friction | | 0.45 | 0.45 | 0.45 | 0.45 | 0.45 | 0.28 | 0.26 | 0.45 | 0.45 | 0.45 |
| Outer layer portion C—H derived C concentration | | 35 atom % | 35 atom % | 35 atom % | 35 atom % | 35 atom % | 35 atom % | 35 atom % | 65 atom % | 70 atom % | 38 atom % |
| Drop in S/N ratio | | 0.6 dB | 0.7 dB | 0.7 dB | 2.6 dB | 3.7 dB | 2.2 dB | 2.2 dB | 2.3 dB | 2.3 dB | 2.6 dB |

Based on the results given in Table 5, the following points were confirmed.

(1) There was little drop in the S/N ratio due to repeated high-speed conveyance in the magnetic tapes of Comparative Examples 1 to 3 in which the combined thickness of the nonmagnetic layer and magnetic layer exceeded 0.60 µm, even when the base portion friction exceeded 0.35 and the outer layer portion C—H derived C concentration was lower than 45 atom %. That is, in a magnetic tape in which the combined thickness of the nonmagnetic layer and the magnetic layer exceeded 0.60 µm, no correlation was found between the drop in the electromagnetic characteristics due to repeated high-speed conveyance on the one hand and the base portion friction and the outer layer portion C—H derived C concentration on the other.

(2) In this regard, a comparison of Examples 1 to 8 and Comparative Examples 4 to 10 reveals that in magnetic tapes in which the combined thickness of the nonmagnetic layer and magnetic layer was less than or equal to 0.60 µm, having a base portion friction of less than or equal to 0.35 and an outer layer portion C—H derived C concentration of greater than or equal to 45 atom % achieved good electromagnetic characteristics even with repeated high-speed conveyance.

An aspect of the present invention is useful in the technical field of magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
    which comprises a nonmagnetic layer comprising nonmagnetic powder and binder on a nonmagnetic support, and a magnetic layer comprising ferromagnetic powder and binder on the nonmagnetic layer; wherein
    a combined thickness of the nonmagnetic layer and the magnetic layer is less than or equal to 0.60 µm;
    a coefficient of friction as measured on a base portion of a surface of the magnetic layer is less than or equal to 0.35;
    at least the magnetic layer comprises one or more components selected from the group consisting of a fatty acid and a fatty acid amide; and
    a C—H derived carbon, C, concentration calculated from a C—H peak area ratio in a C1s spectrum obtained by X-ray photoelectron spectroscopy conducted at a photoelectron take-off angle of 10 degrees on a surface of the magnetic layer is greater than or equal to 45 atom %.

2. The magnetic tape according to claim 1,
    wherein the C—H derived C concentration falls within a range of 45 atom % to 80 atom %.

3. The magnetic tape according to claim 1,
    wherein the C—H derived C concentration falls within a range of 45 atom % to 70 atom %.

4. The magnetic tape according to claim 1,
    wherein the magnetic layer and the nonmagnetic layer each comprise one or more components selected from the group consisting of a fatty acid and a fatty acid amide.

5. The magnetic tape according to claim 1,
    which comprises a backcoat layer comprising nonmagnetic powder and binder on an opposite side of the nonmagnetic support from a side on which the nonmagnetic layer and magnetic layer are present.

6. The magnetic tape according to claim 1,
    which has a total thickness of less than or equal to 6.00 µm.

7. The magnetic tape according to claim 1,
    wherein the ferromagnetic powder is selected from the group consisting of ferromagnetic hexagonal ferrite powder and ferromagnetic metal powder.

8. A magnetic tape cartridge,
    which houses the magnetic tape according to claim 1.

9. The magnetic tape cartridge according to claim 8,
    wherein a total length of the magnetic tape that is housed in the magnetic tape cartridge is greater than or equal to 10 m.

10. A magnetic recording and reproducing device,
    which comprises the magnetic tape cartridge according to claim 8 and a magnetic head.

11. The magnetic recording and reproducing device according to claim 10,
    wherein a relative speed of the magnetic tape and the magnetic head during recording, reproduction, or recording and reproduction, of a magnetic signal on the magnetic tape housed in the magnetic tape cartridge is greater than or equal to 7 m/sec.

12. A method of manufacturing a magnetic tape,
    wherein the magnetic tape is a magnetic tape, which comprises a nonmagnetic layer comprising nonmagnetic powder and binder on a nonmagnetic support, and a magnetic layer comprising ferromagnetic powder and binder on the nonmagnetic layer; wherein
    a combined thickness of the nonmagnetic layer and the magnetic layer is less than or equal to 0.60 µm;
    a coefficient of friction as measured on a base portion of a surface of the magnetic layer is less than or equal to 0.35;
    at least the magnetic layer comprises one or more components selected from the group consisting of a fatty acid and a fatty acid amide; and
    a C—H derived carbon, C, concentration calculated from a C—H peak area ratio in a C1s spectrum obtained by X-ray photoelectron spectroscopy conducted at a photoelectron take-off angle of 10 degrees on a surface of the magnetic layer is greater than or equal to 45 atom %; and the method comprises:

forming a nonmagnetic layer and forming a magnetic layer, wherein the forming of a nonmagnetic layer comprises:

forming a coating layer by coating on a nonmagnetic support a nonmagnetic layer forming composition comprising one or more components selected from the group consisting of a fatty acid and a fatty acid amide, nonmagnetic powder, binder, and solvent, and drying the coating layer by a heat treatment, with cooling the coating layer being conducted between the coating and the drying by a heat treatment.

13. The method of manufacturing a magnetic tape according to claim 12, wherein the cooling is conducted by placing the coating layer in a cooling atmosphere of −10° C. to 0° C.

14. The method of manufacturing a magnetic tape according to claim 12, wherein the solvent that is contained in the nonmagnetic layer forming composition comprises ketone solvent.

15. The method of manufacturing a magnetic tape according to claim 12, wherein the forming of a magnetic layer comprises forming a coating layer by coating on a nonmagnetic layer a magnetic layer forming composition comprising ferromagnetic powder, binder, and solvent, and drying the coating layer of the magnetic layer forming composition by a heat treatment.

16. The method of manufacturing a magnetic tape according to claim 15, wherein the magnetic layer forming composition further comprises one or more components selected from the group consisting of a fatty acid and a fatty acid amide.

17. The method of manufacturing a magnetic tape according to claim 15, wherein either one or both of the nonmagnetic layer forming composition and the magnetic layer forming composition further comprise a fatty acid ester.

* * * * *